United States Patent [19]

Law

[11] Patent Number: 5,055,367
[45] Date of Patent: Oct. 8, 1991

[54] IMAGING MEMBERS WITH BICHROMOPHORIC BISAZO PERINONE PHOTOCONDUCTIVE MATERIALS

[75] Inventor: Kock-Yee Law, Penfield, N.Y.

[73] Assignee: Xerox Corporation, Stamford, Conn.

[21] Appl. No.: 531,484

[22] Filed: May 31, 1990

[51] Int. Cl.$^5$ ............................................. G03G 15/02
[52] U.S. Cl. ........................................ 430/59; 430/58; 430/76; 430/77; 430/78; 534/558; 534/561
[58] Field of Search ................ 430/59, 58, 73, 76, 430/77, 78; 534/561, 558

[56] References Cited

U.S. PATENT DOCUMENTS

| | | | |
|---|---|---|---|
| 3,574,181 | 4/1971 | Forter et al. | 260/152 |
| 3,871,882 | 3/1975 | Wiedemann | 96/1.5 |
| 3,879,200 | 4/1975 | Regensburger et al. | 96/1.5 |
| 4,424,266 | 1/1984 | Kurihara et al. | 430/59 |
| 4,517,270 | 5/1985 | Graser et al. | 430/58 |
| 4,587,189 | 5/1986 | Hor et al. | 430/59 |
| 4,618,672 | 10/1986 | Hashimoto | 534/658 |
| 4,666,805 | 5/1987 | Hashimoto | 430/57 |
| 4,713,307 | 12/1987 | Law et al. | 430/57 |
| 4,755,443 | 7/1988 | Suzuki et al. | 430/58 |
| 4,797,337 | 1/1989 | Law et al. | 430/58 |
| 4,808,506 | 2/1989 | Loutfy et al. | 430/59 |
| 4,833,052 | 5/1989 | Law et al. | 430/58 |
| 4,868,079 | 9/1989 | Khe et al. | 430/72 |
| 4,882,254 | 11/1989 | Loutfy et al. | 430/59 |
| 4,983,480 | 1/1991 | Ueda | 430/58 |

FOREIGN PATENT DOCUMENTS

| | | |
|---|---|---|
| 54-20736 | 2/1979 | Japan . |
| 58-172748 | 6/1983 | Japan . |
| 58-177955 | 10/1983 | Japan . |
| 59-692 | 4/1984 | Japan . |
| 58433 | 4/1984 | Japan . |
| 63-287955 | 11/1988 | Japan . |
| 01198763 | 8/1989 | Japan . |

OTHER PUBLICATIONS

"Electrophotographic Sensitivity of Fluorenone Bisazo Pigments," Denshi Shashin Gakkaishi 25(3), 230–235 (1986), Hashimoto, M.

Primary Examiner—Marion E. McCamish
Assistant Examiner—Rosemary Ashton
Attorney, Agent, or Firm—Judith L. Bjorick

[57] ABSTRACT

Disclosed is an imaging member which comprises a conductive substrate and a photogenerating layer containing a compound selected from the group consisting of:

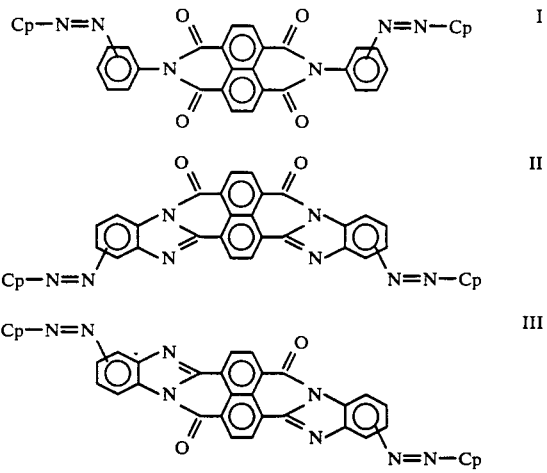

and mixtures thereof, wherein Cp represents a coupler group.

20 Claims, 1 Drawing Sheet

IMAGING MEMBERS WITH BICHROMOPHORIC BISAZO PERINONE PHOTOCONDUCTIVE MATERIALS

BACKGROUND OF THE INVENTION

The present invention is directed to photoresponsive imaging members. More specifically, the present invention is directed to imaging members which contain photoconductive compounds with an azo moiety and a perinone moiety. One embodiment of the present invention is directed to an imaging member which comprises a conductive substrate and a photogenerating layer containing a compound selected from the group consisting of:

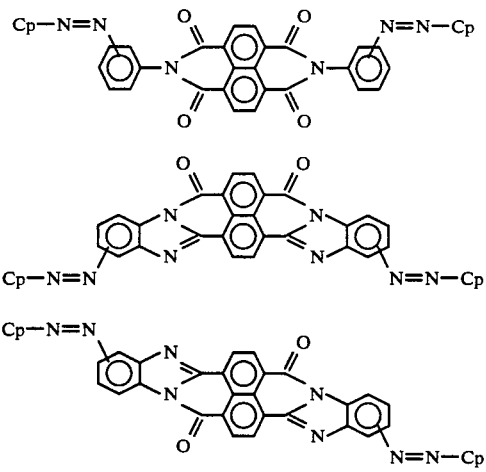

and mixtures thereof, wherein Cp represents a coupler group.

Photoresponsive imaging members are known, such as those consisting of a homogeneous layer of a single material such as vitreous selenium, or composite layered devices containing a dispersion of a photoconductive composition. An example of a composite xerographic photoconductive member is described in U.S. Pat. No. 3,121,006, which discloses finely divided particles of a photoconductive inorganic compound dispersed in an electrically insulating organic resin binder. Imaging members prepared according to the teachings of this patent contain a binder layer with particles of zinc oxide uniformly dispersed therein coated on a paper backing. The binders disclosed in this patent include materials such as polycarbonate resins, polyester resins, polyamide resins, and the like, which are incapable of transporting injected charge carriers generated by the photoconductive particles for any significant distance. Accordingly, the photoconductive particles must be in a substantially contiguous particle to particle contact throughout the layer for the purpose of permitting the charge dissipation required for a cyclic operation.

Photoreceptor materials comprising inorganic or organic materials wherein the charge generating and charge transport functions are performed by discrete contiguous layers are also known. Additionally, layered photoreceptor members are disclosed in the prior art, including photoreceptors having an overcoat layer of an electrically insulating polymeric material. Other layered photoresponsive devices have been disclosed, including those comprising separate photogenerating layers and charge transport layers as described in U.S. Pat. No. 4,265,990, the disclosure of which is totally incorporated herein by reference. Photoresponsive materials containing a hole injecting layer overcoated with a hole transport layer, followed by an overcoating of a photogenerating layer, and a top coating of an insulating organic resin, are disclosed in U.S. Pat. No. 4,251,612, the disclosure of which is totally incorporated herein by reference. Examples of photogenerating layers disclosed in these patents include trigonal selenium and phthalocyanines, while examples of transport layers include certain aryl diamines as illustrated therein.

In addition, U.S. Pat. No. 3,041,167 discloses an overcoated imaging member containing a conductive substrate, a photoconductive layer, and an overcoating layer of an electrically insulating polymeric material. This member can be employed in electrophotographic imaging processes by initially charging the member with an electrostatic charge of a first polarity, followed by exposing it to form an electrostatic latent image that can subsequently be developed to form a visible image.

U.S. Pat. No. 3,574,181 discloses disazo compounds useful as coloring agents. Composite electrophotographic photosensitive materials containing various azo compounds are disclosed in U.S. Pat. No. 4,618,672, wherein bisazo compounds particularly suitable for use in the charge generating layer of a layered electrophotographic photoconductor are illustrated. Similarly, an article by M. Hashimoto entitled "Electrophotographic Sensitivity of Fluorenone Bisazo Pigments," Electrophotography, Vol. 25, No. 3 (1986), discloses disazo compounds as charge generating materials in electrophotographic layered photoreceptors. Further, Japanese Patent Kokai No. 54-20736 discloses disazo pigments as constituents in electrophotographic processes. Japanese Patent 58-177955 also discloses many disazo compounds suitable for use in the photosensitive layer of an electrophotographic device.

U.S. Pat. No. 4,713,307, the disclosure of which is hereby totally incorporated by reference, also discloses photoconductive imaging members containing a supporting substrate, certain azo pigments as photogenerating materials, and a hole transport layer that preferably contains an aryl diamine compound dispersed in an inactive resinous binder.

U.S. Pat. No. 4,797,337, the disclosure of which is totally incorporated herein by reference, discloses a photoconductive imaging member comprising a supporting substrate, a hole transport layer, and a photogenerating layer comprising specific disazo compounds.

Additional references illustrating layered organic electrophotographic photoconductor elements with azo, bisazo, and related compounds include U.S. Pat. Nos. 4,390,611, 4,551,404, 4,596,754, Japanese Patent 60-64354, U.S. Pat. Nos. 4,400,455, 4,390,608, 4,327,168, 4,299,896, 4,314,015, 4,486,522, 4,486,519, 4,555,667, 4,440,845, 4,486,800, 4,309,611, 4,418,133, 4,293,628, 4,427,753, 4,495,264, 4,359,513, 3,898,084, and Japanese Patent Publication 60-111247.

U.S. Pat. No. 4,755,443 discloses a photoreceptor for electrophotography which comprises a charge carrier generating material and charge transport material wherein one charge generating material is a metal phthalocyanine or a metal-free phthalocyanine. The layer containing the generator material also contains an organic amine. Other carrier generating substances can be used in combination with the phthalocyanine generator material, including azo pigments, anthraquinone dyes, perylene dyes, polycyclic quinone dyes, and methine stearate pigments.

U.S. Pat. No. 4,424,266 discloses an electrophotographic photosensitive element having a conductive support and a photosensitive layer comprising a carrier generating phase layer containing a carrier generating material selected from the group consisting of perylene dyes, polycyclic quinones, and azo dyes, and a carrier transporting phase layer containing a hydrazone carrier transporting material. The carrier generator materials can be used either singly or in combination.

U.S. Pat. No. 4,882,254, the disclosure of which is totally incorporated herein by reference, discloses a layered photoresponsive imaging member which comprises a supporting substrate, a photogenerator layer comprising a mixture of first and second pigments, and an aryl amine hole transport layer. The mixture of pigments is selected from perylenes and phthalocyanines, polycyclic quinones and phthalocyanines, or perinones and phthalocyanines.

Japanese Patent Publication J01-198-763 discloses an electrophotographic photoreceptor containing a bisazo series compound in a photosensitive layer formed on a conductive support. A charge transport material is used with the bisazo pigment as a charge generation material, such as 2,4,7-trinitrofluorenone, tetracyanoquinodimethane, carbazole, triarylalkane derivatives, phenylenediamine derivatives, hydrazone compounds, or stilbene derivatives.

Photoresponsive imaging members containing perinone and perylene compounds are also known. For example, European Patent Publication 0040402, DE3019326, filed May 21, 1980, discloses the use of N,N'-disubstituted perylene-3,4,9,10-tetracarboxyldiimide pigments as photoconductive substances. Specifically, there is disclosed in this publication evaporated N,N'-bis(3-methoxypropyl)perylene-3,4,9,10-tetracarboxyldiimide dual layered negatively charged photoreceptors with improved spectral response in the wavelength region of 400 to 700 nanometers. A similar disclosure is contained in Ernst Gunther Schlosser, *Journal of Applied Photographic Engineering*, Vol. 4, No. 3, page 118 (1978). Further, U.S. Pat. No. 3,871,882 discloses photoconductive substances comprising specific perylene-3,4,9,10-tetracarboxylic acid derivative dyestuffs. According to the teachings of this patent, the photoconductive layer is preferably formed by vapor depositing the dyestuff in a vacuum. This patent discloses dual layer photoreceptors with perylene-3,4,9,10-tetracarboxylic acid diimide derivatives, which have spectral response in the wavelength region of from 400 to 600 nanometers. Additionally, U.S. Pat. No. 3,879,200 discloses imaging members with perinones. Furthermore, layered imaging members with imidazole thiazinoperinone photogenerators and related components are illustrated in U.S. Pat. No. 4,517,270 and in Japanese Laid Open Publications 59-58433/84 and 59-59682/84.

U.S. Pat. No. 4,808,506, the disclosure of which is totally incorporated herein by reference, discloses a layered photoresponsive imaging member which comprises a supporting substrate, an imidazole perinone comprising components with a mixture of cis and trans isomers of a specific formula, including trans indanthrene Brilliant Orange, cis indanthrene Bordeauxs Red, bis-(4,5-dimethyl)benzimidazole perinone and bis-2,3- naphthimidazole perinone, and an aryl amine hole transport layer.

U.S. Pat. No. 4,587,189, the disclosure of which is totally incorporated herein by reference, discloses a photoresponsive imaging member comprising a supporting substrate, a vacuum evaporated photogenerator layer which comprises a perylene pigment.

Imaging members with phthalocyanine materials are also known, as disclosed in, for example, U.S. Pat. Nos. 3,594,163, 3,657,272, 3,816,118, 3,862,127, 3,903,107, 3,927,026, 3,932,180, 3,932,454, 4,031,109, 4,098,795, and U.S. Pat. No. Re. 27,117, the disclosures of each of which are totally incorporated herein by reference.

Of background interest is U.S. Pat. No. 4,868,079, which discloses an electrophotoconductor comprising a conductive support and a photoconductive layer comprising a resin binder having dispersed therein an anthranthrone compound, a phthalocyanine compound, and an oxadiazole compound.

Although known imaging members are suitable for their intended purposes, a need remains for imaging members containing bichromophoric photoconductive materials. In addition, a need exists for imaging members containing photoconductive materials with improved photoconductivity. Further, there is a need for imaging members containing photoconductive materials having azo moieties wherein the hole transporting and electron transporting mobility of the azo material is enhanced. There is also a need for imaging members containing photoconductive materials having azo moieties and a perinone moiety wherein the material has enhanced dispersability in polymers and solvents. Additionally, a need remains for imaging members containing photoconductive materials wherein the optical absorption of the material is increased. A need also remains for photoconductive materials having increased optical absorption, thereby enabling the use of reduced amounts of photoconductive material in an imaging member charge generating layer and thus improviding electrical and environmental stability of the member. Further, there is a need for photoconductive materials with enhanced dispersability in polymers and solvents that enable low cost coating processes in the manufacture of photoconductive imaging members.

SUMMARY OF THE INVENTION

It is an object of the present invention to provide imaging members containing bichromorphic photoconductive materials.

It is another object of the present invention to provide imaging members containing photoconductive materials with improved photoconductivity.

It is yet another object of the present invention to provide imaging members containing photoconductive materials having azo moieties wherein the hole transporting and electron transporting mobility of the azo material is enhanced.

It is still another object of the present invention to provide imaging members containing photoconductive materials having azo moieties and a perinone moiety wherein the material has enhanced dispersability in polymers and solvents.

Another object of the present invention is to provide imaging members containing photoconductive materials wherein the optical absorption of the material is increased.

Yet another object of the present invention is to provide photoconductive materials having increased optical absorption, thereby enabling the use of reduced amounts of photoconductive material in an imaging member charge generating layer and thus improving electrical and environmental stability of the member.

Still another object of the present invention is to provide photoconductive materials with enhanced dispersability in polymers and solvents that enable low cost coating processes in the manufacture of photoconductive imaging members.

These and other objects of the present invention are achieved by providing an imaging member which comprises a conductive substrate and a photogenerating layer containing a compound selected from the group consisting of:

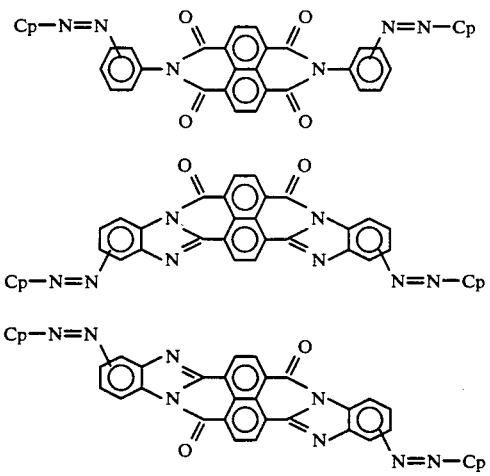

and mixtures thereof, wherein Cp represents a coupler group.

DETAILED DESCRIPTION OF THE INVENTION

Figure 1:
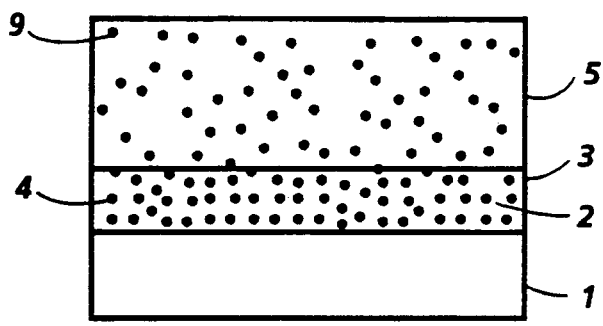
FIGS. 1, 2, 3, and 4 are schematic cross-sectional views of examples of photoconductive imaging members of the present invention.

FIG. 1 illustrates schematically one embodiment of the imaging members of the present invention. Specifically, FIG. 1 shows a photoconductive imaging member comprising a conductive substrate 1, a photogenerating layer 3 comprising a bichromophoric photogenerating compound 2 selected from the group consisting of those compounds represented by Formulae I, II, and III or mixtures thereof optionally dispersed in a resinous binder composition 4, and a charge transport layer 5, which comprises a hole transporting molecule dispersed in an inactive resinous binder composition 9.

Figure 2:
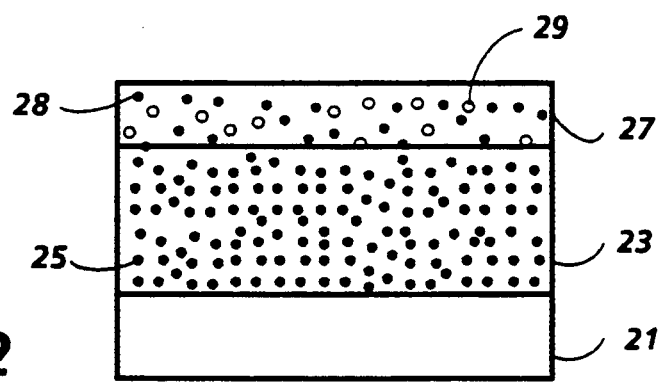

FIG. 2 illustrates schematically essentially the same member as that shown in FIG. 1 with the exception that the hole transport layer is situated between the conductive substrate and the photogenerating layer. More specifically, this Figure illustrates a photoconductive imaging member comprising a conductive substrate 21, a hole transport layer 23 comprising a hole transport composition dispersed in an inactive resinous binder composition 25, and a photogenerating layer 27 comprising a bichromophoric photogenerating compound 28 selected from the group consisting of those compounds represented by Formulae I, II, and III or mixtures thereof optionally dispersed in a resinous binder composition 29.

Figure 3:
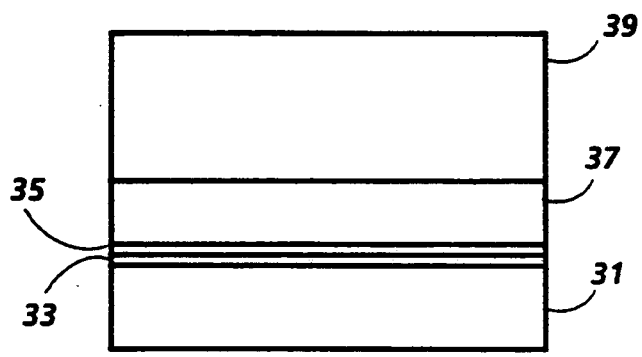

FIG. 3 illustrates schematically a photoconductive imaging member of the present invention comprising a conductive substrate 31, a hole blocking metal oxide layer 33, an optional adhesive layer 35, a photogenerating layer 37 comprising a bichromophoric photogenerating compound selected from the group consisting of those compounds represented by Formulae I, II, and III or mixtures thereof optionally dispersed in a resinous binder composition; and an aryl amine hole transport layer 39 comprising an aryl amine hole transport compound optionally dispersed in a resinous binder.

Figure 4:
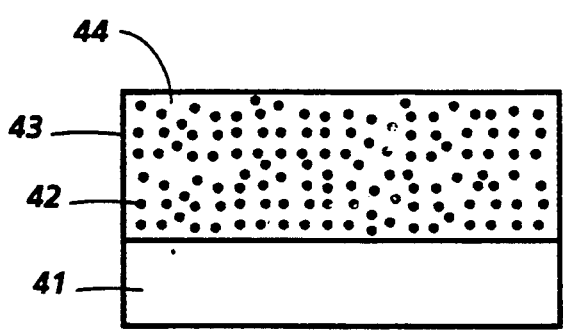

FIG. 4 illustrates schematically a photoconductive imaging member of the present invention comprising a conductive substrate 41 and a photogenerating layer 43 comprising a bichromophoric photogenerating compound 42 selected from the group consisting of those compounds represented by Formulae I, II, and III or mixtures thereof optionally dispersed in a resinous binder composition 44.

The substrate can be formulated entirely of an electrically conductive material, or it can be an insulating material having an electrically conductive surface. The substrate is of an effective thickness, generally up to about 100 mils, and preferably from about 1 to about 50 mils, although the thickness can be outside of this range. The thickness of the substrate layer depends on many factors, including economic and mechanical considerations. Thus, this layer may be of substantial thickness, for example over 100 mils, or of minimal thickness provided that there are no adverse effects on the system. In a particularly preferred embodiment, the thickness of this layer is from about 3 mils to about 10 mils. The substrate can be opaque or substantially transparent and can comprise numerous suitable materials having the desired mechanical properties. The entire substrate can comprise the same material as that in the electrically conductive surface or the electrically conductive surface can merely be a coating on the substrate. Any suitable electrically conductive material can be employed. Typical electrically conductive materials include copper, brass, nickel, zinc, chromium, stainless steel, conductive plastics and rubbers, aluminum, semitransparent aluminum, steel, cadmium, silver, gold, paper rendered conductive by the inclusion of a suitable material therein or through conditioning in a humid atmosphere to ensure the presence of sufficient water content to render the material conductive, indium, tin, metal oxides, including tin oxide and indium tin oxide, and the like. The substrate layer can vary in thickness over substantially wide ranges depending on the desired use of the electrophotoconductive member. Generally, the conductive layer ranges in thickness from about 50 Angstroms to many centimeters, although the thickness can be outside of this range. When a flexible electrophotographic imaging member is desired, the thickness typically is from about 100 Angstroms to about 750 Angstroms. The substrate can be of any other conventional material, including organic and inorganic materials. Typical substrate materials include insulating nonconducting materials such as various resins known for this purpose including polycarbonates, polyamides, polyurethanes, paper, glass, plastic, polyesters such as Mylar ® (available from Du Pont) or Melinex 447 (available from ICI Americas, Inc.), and the like. If desired, a conductive substrate can be coated onto an insulating material. In addition, the substrate can comprise a metallized plastic, such as titanized or aluminized Mylar®, wherein the metallized surface is in contact with the photogenerating layer or any other layer situated between the substrate and the photogenerating layer. The coated or uncoated substrate can be flexible or rigid, and can have any number of configurations, such as a plate, a cylindrical drum, a scroll, an endless flexible belt, or the like. The outer surface of the substrate preferably comprises a metal oxide such as aluminum oxide, nickel oxide, titanium oxide, and the like.

In some cases, intermediate adhesive layers between the substrate and subsequently applied layers may be desirable to improve adhesion. If such adhesive layers are utilized, they preferably have a dry thickness of from about 0.1 micron to about 5 microns, although the thickness can be outside of this range. Typical adhesive layers include film-forming polymers such as polyester, polyvinylbutyral, polyvinylpyrolidone, polycarbonate, polyurethane, polymethylmethacrylate, and the like as well as mixtures thereof. Since the surface of the substrate can be a metal oxide layer or an adhesive layer, the expression "substrate" as employed herein is intended to include a metal oxide layer with or without an adhesive layer on a metal oxide layer.

The photogenerating layer contains a bichromophoric photogenerating compound of Formulae I, II, or III or a mixture of two or more compounds of these formulae. Generally, this layer has a thickness of from about 0.05 micron to about 10 microns or more, and preferably has a thickness of from about 0.1 micron to about 3 microns. The thickness of this layer, however, is dependent primarily upon the concentration of photogenerating material in the layer, which may generally vary from photogenerating material in the layer, which may generally vary from about 5 to 100 percent. When the photogenerating material is present in a binder material, the binder preferably contains from about 30 to about 95 percent by weight of the photogenerating material, and preferably contains about 80 percent by weight of the photogenerating material. Generally, it is desirable to provide this layer in a thickness sufficient to absorb about 90 percent or more of the incident radiation which is directed upon it in the imagewise or printing exposure step. The maximum thickness of this layer is dependent primarily upon factors such as mechanical considerations, such as the specific photogenerating compound selected, the thicknesses of the other layers, and whether a flexible photoconductive imaging member is desired.

When present, the optional charge transport layer can comprise any suitable charge transport material. Examples of charge transport materials include pure selenium, selenium-arsenic alloys, selenium-arsenic-halogen alloys, selenium-halogen, and the like. Generally, from about 10 parts by weight per million to about 200 parts by weight per million of halogen are present in a halogen doped selenium charge transport layer, although the amount can be outside of this range. If a halogen doped transport layer free of arsenic is utilized, the halogen content preferably is less than about 20 parts by weight per million. Transport layers are well known in the art. Typical transport layers are described, for example, in U.S. Pat. No. 4,609,605 and in U.S. Pat. No. 4,297,424, the disclosures of each of these patents being totally incorporated herein by reference.

Organic charge transport materials can also be employed. Typical charge transporting materials include the following:

Diamine transport molecules of the type described in U.S. Pat. Nos. 4,306,008; 4,304,829; 4,233,384; 4,115,116, 4,299,897 and 4,081,274, the disclosures of each of which are totally incorporated herein by reference. Typical diamine transport molecules include N,N'-diphenyl-N,N'-bis(3"-methylphenyl)-(1,1'-biphenyl)-4,4'-diamine, N,N'-diphenyl-N,N'-bis(4-methylphenyl)-(1,1'-biphenyl)-4,4'-diamine, N,N'-diphenyl-N,N'-bis(2-methylphenyl)-(1,1'-biphenyl)-4,4'-diamine, N,N'-diphenyl-N,N'-bis(3-ethylphenyl)-(1,1'-biphenyl)-4,4'-diamine, N,N'-diphenyl-N,N'-bis(4-ethylphenyl)-(1,1'-diphenyl)-4,4'-diamine, N,N'-diphenyl-N,N'-bis(4-n-butylphenyl)-(1,1'-biphenyl)-4,4'-diamine, N,N'-diphenyl-N,N'-bis(3-chlorophenyl)-[1,1'-biphenyl]-4,4'-diamine, N,N'-diphenyl-N,N'-bis(4-chlorophenyl)-[1,1'-biphenyl]-4,4'-diamine, N,N'-diphenyl-N,N'-bis(phenylmethyl)-[1,1'-biphenyl]-4,4'-diamine, N,N,N',N'-tetraphenyl-[2,2'-dimethyl-1,1'-biphenyl]-4,4'-diamine, N,N,N',N'-tetra-(4-methylphenyl)[2,2'-dimethyl-1,1'-biphenyl]-4,4'-diamine, N,N'-diphenyl-N,N'-bis(4-methylphenyl)-[2,2'-dimethyl-1,1'-biphenyl]-4,4'-diamine, N,N'-diphenyl-N,N'-bis(2-methylphenyl)-[2,2'-dimethyl-1,1'-biphenyl]-4,4'-diamine, N,N'-diphenyl-N,N'-bis(3-methylphenyl)-[2,2'-dimethyl-1,1'-biphenyl]-4,4'-diamine, N,N'-diphenyl-N,N'-bis(3-methylphenyl)-pyrenyl-1,6-diamine, and the like.

Pyrazoline transport molecules as disclosed in U.S. Pat. Nos. 4,315,982; 4,278,746 and 3,837,851, the disclosures of each of which are totally incorporated herein by reference. Typical pyrazoline transport molecules include 1-[lepidyl-(2)]-3-(p-diethylaminophenyl)-5-(p-diethylaminophenyl)pyrazoline, 1-[quinolyl-(2)]-3-(p-diethylaminophenyl)-5-(p-diethylaminophenyl)pyrazoline, 1-[pyridyl-(2)]-3-(p-diethylaminostyryl)-5-(p-diethylaminophenyl)pyrazoline, 1-[6-methoxypyridyl-(2)]-3-(p-diethylaminostyryl)-5-(p-diethylaminophenyl)-pyrazoline, 1-phenyl-3-[p-dimethylaminostyryl]-5-(p-dimethylaminostyryl)pyrazoline, 1-phenyl-3-[p-diethylaminostyryl]-5-(p-diethylaminostyryl)pyrazoline, and the like.

Substituted fluorene charge transport molecules as described in U.S. Pat. No. 4,245,021, the disclosure of which is totally incorporated herein by reference. Typical fluorene charge transport molecules include 9-(4'-dimethylaminobenzylidene)fluorene, 9-(4'-methoxybenzylidene)fluorene, 9-(2',4'-dimethoxybenzylidene)fluorene, 2-nitro-9-benzylidene-fluorene, 2-nitro-9-(4'-diethylaminobenzylidene)fluorene, and the like.

Oxadiazole transport molecules such as 2,5-bis(4-diethylaminophenyl)-1,3,4-oxadiazole, pyrazoline, imidazole, triazole, and the like. Other typical oxadiazole, pyrazoline, imidazole, triazole, and the like. Other typical oxadiazole transport molecules are described, for example, in German Patents 1,058,836; 1,060,260 and 1,120,875, the disclosures of each of which are totally incorporated herein by reference.

Hydrazone transport molecules, such as p-diethylaminobenzaldehyde-(diphenylhydrazone), o-ethoxy-p-diethylaminobenzaldehyde-(diphenylhydrazone), o-methyl-p-diethylaminobenzaldehyde-(diphenylhydrazone), o-methyl-p-dimethylaminobenzaldehyde-(diphenylhydrazone), 1-naphthalenecarbaldehyde 1-methyl-1-phenylhydrazone, 1-naphthalenecarbaldehyde 1,1-phenylhydrazone, 4-methoxynaphthlene-1-carbaldehyde 1-methyl-1-phenylhydrazone, and the like. Other typical hydrazone transport molecules are described, for example, in U.S. Pat. Nos.

4,150,987; 4,385,106; 4,338,388 and 4,387,147, the disclosures of each of which are totally incorporated herein by reference.

Carbazole phenyl hydrazone transport molecules such as 9-methylcarbazole-3-carbaldehyde-1,1-diphenylhydrazone, 9-ethylcarbazole-3-carbaldehyde-1-methyl-1-phenylhydrazone, 9-ethylcarbazole-3-carbaldehyde-1-ethyl-1-phenylhydrazone, 9-ethylcarbazole-3-carbaldehyde-1-ethyl-1-benzyl-1-phenylhydrazone, 9-ethylcarbazole-3-carbaldehyde-1,1-diphenylhydrazone, and the like. Other typical carbazole phenyl hydrazone transport molecules are described, for example, in U.S. Pat. Nos. 4,256,821 and 4,297,426, the disclosures of each of which are totally incorporated herein by reference.

Vinyl-aromatic polymers such as polyvinyl anthracene, polyacenaphthylene; formaldehyde condensation products with various aromatics such as condensates of formaldehyde and 3-bromopyrene; 2,4,7-trinitrofluorenone, and 3,6-dinitro-N-t-butylnaphthalimide as described, for example, in U.S. Pat. No. 3,972,717, the disclosure of which is totally incorporated herein by reference.

Oxadiazole derivatives such as 2,5-bis-(p-diethylaminophenyl)oxadiazole-1,3,4 described in U.S. Pat. No. 3,895,944, the disclosure of which is totally incorporated herein by reference.

Tri-substituted methanes such as alkyl-bis(N,N-dialkylaminoaryl)methane, cycloalkyl-bis(N,N-dialkylaminoaryl)methane, and cycloalkenyl-bis(N,N-dialkylaminoaryl)methane as described in U.S. Pat. No. 3,820,989, the disclosure of which is totally incorporated herein by reference.

9-Fluorenylidene methane derivatives having the formula

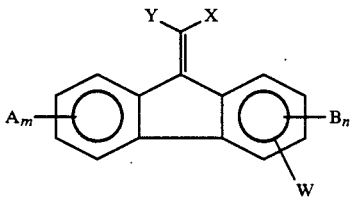

wherein X and Y are cyano groups or alkoxycarbonyl groups, A, B, and W are electron withdrawing groups independently selected from the group consisting of acyl, alkoxycarbonyl, nitro, alkylaminocarbonyl, and derivatives thereof, m is a number of from 0 to 2, and n is the number 0 or 1 as described in U.S. Pat. No. 4,474,865, the disclosure of which is totally incorporated herein by reference. Typical 9-fluorenylidene methane derivatives encompassed by the above formula include (4-n-butoxycarbonyl-9-fluorenylidene)-malononitrile, (4-phenethoxycarbonyl-9-fluorenylidene)malononitrile, (4-carbitoxy-9-fluorenylidene)malononitrile, (4-n-butoxycarbonyl-2,7-dinitro-9-fluorenylidene)malonate, and the like.

Other charge transport materials include poly-1-vinylpyrene, poly-9-vinylanthracene, poly-9-(4-pentenyl)-carbazole, poly-9-(5-hexyl)carbazole, polymethylene pyrene, poly-1-(pyrenyl)-butadiene, polymers such as alkyl, nitro, amino, halogen, and hydroxy substitute polymers such as poly-3-amino carbazole, 1,3-dibromo-poly-N-vinyl carbazole, 3,6-dibromo-poly-N-vinyl carbazole, and numerous other transparent organic polymeric or non-polymeric transport materials as described in U.S. Pat. No. 3,870,516, the disclosure of which is totally incorporated herein by reference.

A particularly preferred charge transport molecule is one having the general formula

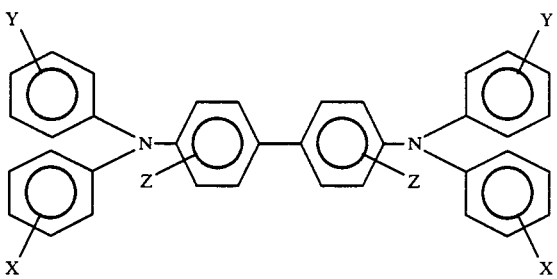

wherein X, Y and Z are selected from the group consisting of hydrogen, an alkyl group having from 1 to about 20 carbon atoms and chlorine, and at least one of X, Y and Z is independently selected to be an alkyl group having from 1 to about 20 carbon atoms or chlorine. If Y and Z are hydrogen, the compound may be named N,N'-diphenyl-N,N'-bis(alkylphenyl)-[1,1'-biphenyl]-4,4'-diamine wherein the alkyl is, for example, methyl, ethyl, propyl, n-butyl, or the like, or the compound may be N,N'-diphenyl-N,N'-bis(chlorophenyl)-[1,1'-biphenyl]-4,4'-diamine.

The charge transport material is present in the charge transport layer in an effective amount, generally from about 5 to about 90 percent by weight, preferably from about 20 to about 75 percent by weight, and more preferably from about 30 to about 60 percent by weight, although the amount can be outside of this range.

Examples of the highly insulating and transparent resinous components or inactive binder resinous material for the transport layers include materials such as those described in U.S. Pat. No. 3,121,006, the disclosure of which is totally incorporated herein by reference. Specific examples of suitable organic resinous materials include polycarbonates, arcylate polymers, vinyl polymers, cellulose polymers, polyesters, polysiloxanes, polyamides, polyurethanes, polystyrenes, and epoxies as well as block, random or alternating copolymers thereof. Preferred electrically inactive binder materials are polycarbonate resins having a molecular weight of from about 20,000 to about 100,000 with a molecular weight in the range of from about 50,000 to about 100,000 being particularly preferred. Generally, the resinous binder contains from about 5 to about 90 percent by weight of the active material corresponding to the foregoing formula, and preferably from about 20 percent to about 75 percent of this material.

Similar binder materials may be selected for the photogenerating layer, including polyesters, polyvinyl butyrals, polycarbonates, polyvinyl formals, and those illustrated in U.S. Pat. No. 3,121,006, the disclosure of which is totally incorporated herein by reference. A preferred class of binder material for the photogenerating layer is a poly(vinyl acetal).

The photoconductive imaging member may optionally contain a charge blocking layer situated between the conductive substrate and the photogenerating layer. This layer may comprise metal oxides, such as aluminum oxide and the like, or materials such as silanes and nylons. Additional examples of suitable materials include polyisobutyl methacrylate, copolymers of styrene and acrylates such as styrene/n-butyl methacrylate, copolymers of styrene and vinyl toluene, polycarbonates, alkyl substituted polystyrenes, styrene-olefin copolymers, polyesters, polyurethanes, polyterpenes, silicone elastomers, mixtures thereof, copolymers thereof, and the like. The primary purpose of this layer is to prevent charge injection from the substrate during and after charging. This layer is of a thickness of less than 50 Angstroms to about 10 microns, preferably being no more than about 2 microns.

In addition, the photoconductive imaging member may also optionally contain an adhesive interface layer situated between the hole blocking layer and the photogenerating layer. This layer may comprise a polymeric material such as polyester, polyvinyl butyral, polyvinyl pyrrolidone and the like. Typically, this layer is of a thickness of less than about 0.6 micron.

The bichromophoric photogenerating pigments employed in the imaging members of the present invention are of the following formulae:

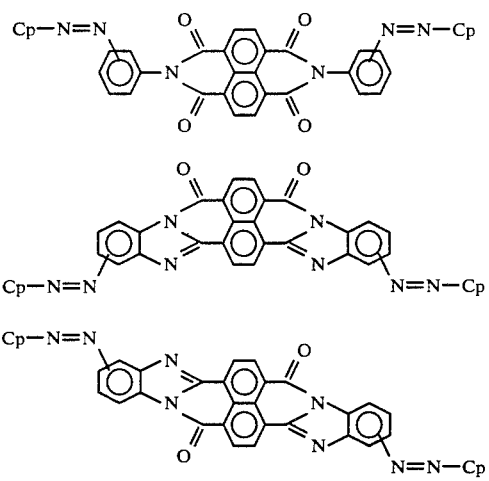

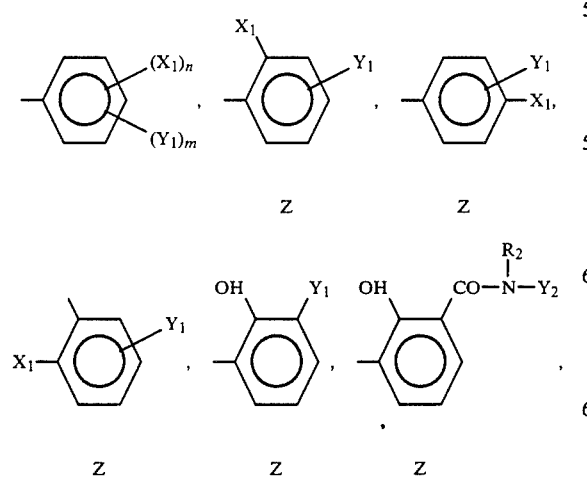

wherein Cp represents a coupler group. The photogenerating compound can be symmetrical and contain two identical coupler groups or unsymmetrical and contain two different coupler groups. Most coupler groups are aromatic hydrocarbon compounds or heterocyclic compounds with a phenolic hydroxy group, such as 2-naphthol derivatives, although other couplers are also suitable. Examples of suitable coupler groups include

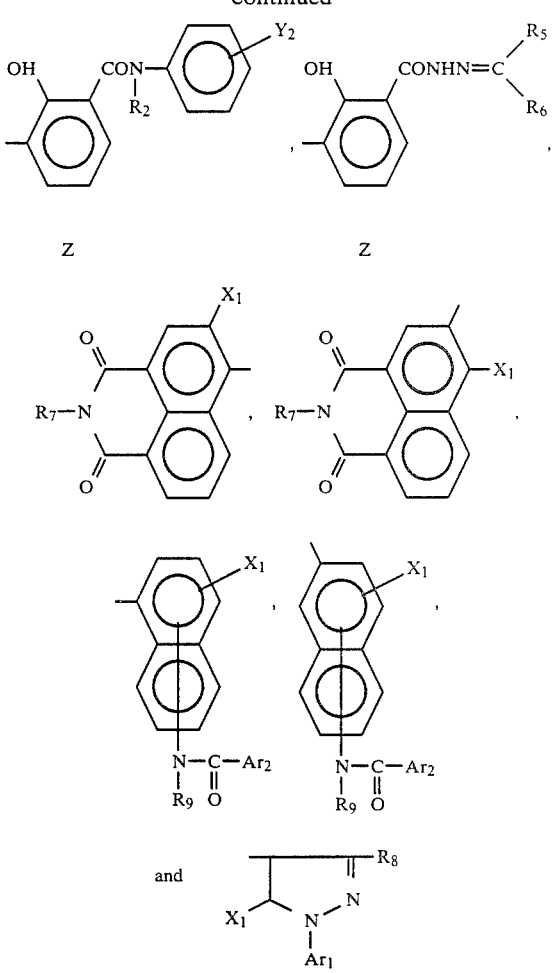

wherein $X_1$ represents —OH, —NR$_1$R$_2$, or —NH-SO$_2$—R$_3$ (wherein R$_1$ and R$_2$ are hydrogen or a substituted or non-substituted alkyl group and R$_3$ is a substituted or non-substituted alkyl or a substituted or non-substituted aryl group), Y$_1$ represents hydrogen, halogen, substituted or non-substituted alkyl groups, substituted or non-substituted alkoxy groups, carboxyl group, sulfo group, substituted or non-substituted sulfamoyl groups, or

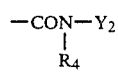

(wherein R$_4$ is hydrogen, an alkyl group, a substituted alkyl group, a phenyl group, or a substituted phenyl group, and Y$_2$ is a cyclic hydrocarbon, a substituted cyclic hydrocarbon, a heterocycle, or a substituted heterocycle, or

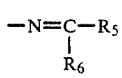

wherein R$_5$ represents a cyclic hydrocarbon, a substituted cyclic hydrocarbon, a heterocycle, or a substituted heterocycle and R$_6$ represents hydrogen, an alkyl group, a substituted alkyl group, a phenyl group, or a substituted phenyl group, and wherein R$_5$ and R$_6$ may form a ring with carbons bonded thereto), Z represents a cyclic hydrocarbon or a substituted cyclic hydrocarbon, or a heterocycle or a substituted heterocycle, n is an integer of 1 or 2, m is an integer of 1 or 2, $R_7$ is a substituted or non-substituted hydrocarbonyl group, $R_8$ is an alkyl group, a carbamoyl group, a carboxyl group, or a carboxyl ester, $Ar_1$ is a cyclic hydrocarbon or a substituted cyclic hydrocarbon, $R_9$ is hydrogen or a substituted or non-substituted hydrocarbonyl group, and $Ar_2$ is a cyclic hydrocarbon or a substituted cyclic hydrocarbon. Specific examples of the cyclic hydrocarbon ring Z include a benzene ring, a naphthalene group, or the like, as well as heterocycles such as an indole ring, a carbazole ring, a benzofuran ring, and the like. Examples of substituents for the Z ring include halogen atoms such as chlorine, fluorine, iodine, or bromine and the like. Examples of the cyclic hydrocarbon $Y_2$ or $R_5$ include phenyl, naphthyl, anthryl, pyrenyl, and the like, as well as heterocycles such as pyridyl, thienyl, furyl, indolyl, benzofuranyl, carbazolyl, dibenzofuranyl, and the like. Examples of the ring formed by bonding $R_5$ and $R_6$ include a fluorene ring. Examples of substituents for $Y_2$ and $R_5$ or the ring formed by bonding $R_5$ and $R_6$ include alkyl groups such as methyl, ethyl, propyl, butyl, or the like, alkoxy groups such as methoxy, ethoxy, propoxy, butoxy, or the like, halogen atoms such as chlorine, fluorine, bromine, iodine, or the like, dialkyl amino groups such as dimethyl amino, diethyl amino, or the like, diaralkyl amino groups such as dibenzyl amino or the like, halomethyl groups such as trifluoromethyl or the like, a nitro group, a cyano group, a carboxyl group or an ester, a hydroxyl group, a sulfonate group such as —$SO_3Na$, or the like. Examples of substituents for group $R_4$ include halogen atoms such as chlorine, fluorine, bromine, or iodine and the like. Examples of hydrocarbonyl groups $R_7$ and $R_9$ include alkyl groups such as methyl, ethyl, propyl, butyl, and the like, aralkyl groups such as benzyl and the like, aryl groups such as phenyl, or the like, as well as substituted groups. Examples of substituents for $R_7$ and $R_9$ include alkyl groups such as methyl, ethyl, propyl, butyl, or the like, alkoxy groups such as methoxy, ethoxy, propoxy, butoxy, or the like, halogen atoms such as chlorine, bromine, fluorine, iodine, or the like, a hydroxyl group, a nitro group, and the like. Examples of cyclic hydrocarbons $Ar_1$ and $Ar_2$ include phenyl, naphthyl, and the like, and examples of substituents for these groups include alkyl groups such as methyl, ethyl, propyl, butyl, or the like, alkoxy groups such as methoxy, ethoxy, propoxy, butoxy, or the like, a nitro group, a halogen group such as chlorine, bromine, fluorine, iodine, or the like, a cyano group, a dialkyl amino group such as dimethyl amino, diethyl amino, or the like.

Specific examples of suitable coupler groups include

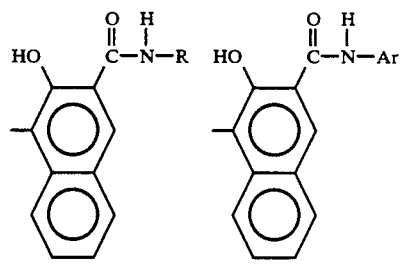

wherein R is a substituted or non-substituted aliphatic linear or branched hydrocarbon with from 1 to about 20 carbon atoms, preferably with from 1 to about 10 carbon atoms, and Ar is a substituted or non-substituted aromatic hydrocarbon group with from 6 to about 24 carbon atoms or heterocyclic moiety;

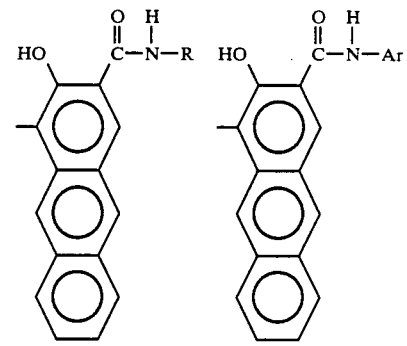

wherein R is a substituted or non-substituted aliphatic linear or branched hydrocarbon with from 1 to about 20 carbon atoms, preferably with from 1 to about 10 carbon atoms, and Ar is a substituted or non-substituted aromatic hydrocarbon group with from 6 to about 24 carbon atoms or heterocyclic moiety;

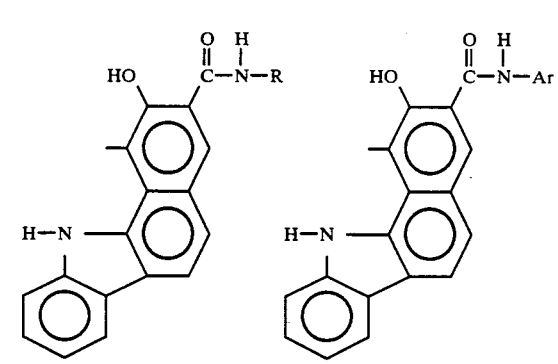

wherein R is a substituted or non-substituted aliphatic linear or branched hydrocarbon with from 1 to about 20 carbon atoms, preferably with from 1 to about 10 carbon atoms, and Ar is a substituted or non-substituted aromatic hydrocarbon group with from 6 to about 24 carbon atoms or heterocyclic moiety;

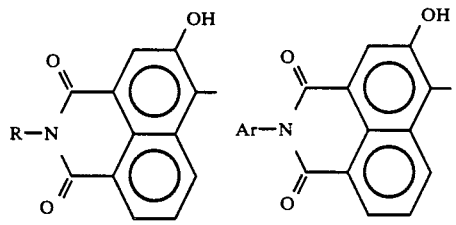

wherein R is a substituted or non-substituted aliphatic linear or branched hydrocarbon with from 1 to about 20 carbon atoms, preferably with from 1 to about 10 carbon atoms, and Ar is a substituted or non-substituted aromatic hydrocarbon group with from 6 to about 24 carbon atoms or heterocyclic moiety;

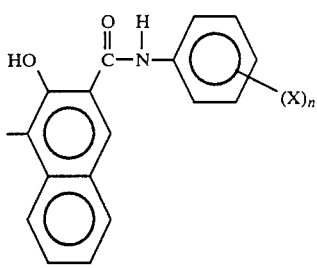

wherein X is selected from the group consisting of H, CH₃, C₂H₅, C₃H₇, Cl, F, Br, I, NO₂, CF₃, OCH₃, OC₂H₅, CN, NH₂, OH, or other substituents and n is 0, 1, 2, or 3;

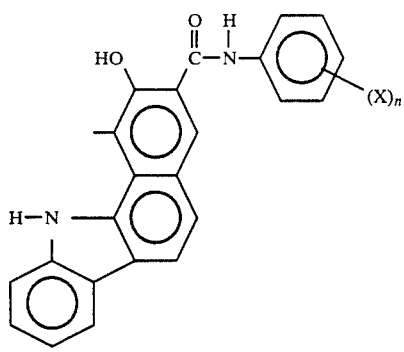

wherein X is selected from the group consisting of H, CH₃, C₂H₅, C₃H₇, Cl, F, Br, I, NO₂, CF₃, OCH₃, OC₂H₅, CN, NH₂, OH, or other substituents and n is 0, 1, 2, or 3;

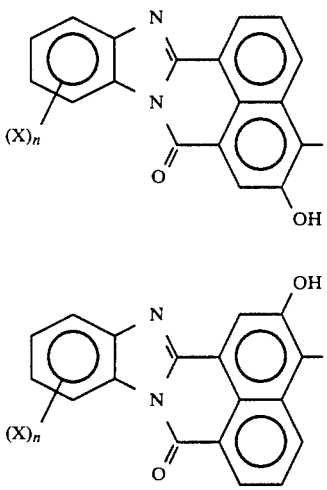

wherein X is selected from the group consisting of H, CH₃, C₂H₅, C₃H₇, Cl, F, Br, I, NO₂, CF₃, OCH₃, OC₂H₅, CN, NH₂, OH, or other substituents and n is 0, 1, 2, or 3;

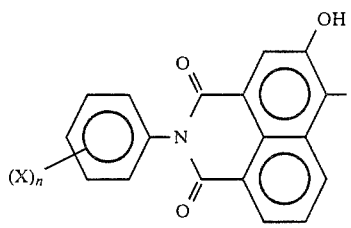

wherein X is selected from the group consisting of H, CH₃, C₂H₅, C₃H₇, Cl, F, Br, I, NO₂, CF₃, OCH₃, OC₂H₅, CN, NH₂, OH, or other substituents and n is 0, 1, 2, or 3; or any other suitable coupler group. Additional examples of coupler groups are disclosed in, for example, U.S. Pat. No. 4,666,805, the disclosure of which is totally incorporated herein by reference.

Additional examples of suitable couplers include 2-hydroxy-3-naphthanilide, 2-hydroxy-3-naphtho-o-nitroanilide, and 2-hydroxy-3-naphtho-p-nitroanilide, all available from Aldrich Chemical Company; 2-hydroxy-3-naphtho-o-methoxyanilide, 2-hydroxy-3-naphtho-p-methoxyanilide, 2-hydroxy-3-naphtho-o-methylanilide, 2-hydroxy-3-naphtho-p-chloroanilide, 2-hydroxy-3-naphtho-m-nitroanilide, all available from Pfaltz & Bauer Company; Naphthol AS-SG and Naphthol AS-GR, available from Sigma Corporation; 2-hydroxy-3-naphtho-p-methylanilide, 2-hydroxy-3-naphtho-m-methylanilide, 2-hydroxy-3-naphtho-p-fluoroanilide, 2-hydroxy-3-naphtho-o-fluoroanilide, 2-hydroxy-3-naphtho-o-chloroanilide, 2-hydroxy-3-naphtho-m-chloroanilide, 2-hydroxy-3-naphtho-p-bromoanilide, 2-hydroxy-3-naphtho-o-bromoanilide, 2-hydroxy-3-naphtho-p-trifluoromethylanilide, 2-hydroxy-3-naphtho-m-trifluoromethylanilide, 2-hydroxy-3-naphtho-o-ethylanilide, 3-hydroxy-1,8-benzimidazole-naphthalene, N-phenyl-3-hydroxyl-1,8-naphthalimide, 2-hydroxy-11H-benzo(a)carbazole-3-carbox-anilide, 2-hydroxy-11H-benzo(a)carbazole-3-carbox-p-methylanilide, 2-hydroxy-11H-benzo(a)carbazole-3-carbox-o-methylanilide, 2-hydroxy-11H-benzo(a)carbazole-3-carbox-o-ethylanilide, 2-hydroxy-11H-benzo(a)carbazole-3-carbox-p-fluoroanilide, 2-hydroxy-11H-benzo(a)carbazole-3-carbox-m-fluoroanilide, 2-hydroxy-11H-benzo(a)carbazole-3-carbox-p-chloroanilide, 2-hydroxy-11H-benzo(a)carbazole-3-carbox-m-chloroanilide, 2-hydroxy-11H-benzo(a)carbazole-3-carbox-o-chloroanilide, 2-hydroxy-11H-benzo(a)carbazole-3-carbox-p-bromoanilide, 2-hydroxy-11H-benzo(a)carbazole-3-carbox-o-trifluoromethylanilide, 2-hydroxy-11H-benzo(a)carbazole-3-carbox-p-trifluoromethylanilide, 2-hydroxy-11H-benzo(a)carbazole-3-carbox-m-nitroanilide, 2-hydroxy-11H-benzo(a)carbazole-3-carbox-p-nitroanilide, 2-hydroxy-8-chloro-11H-benzo(a)carbazole-3-carbox-anilide, 2-hydroxy-8-chloro-11H-benzo(a)carbazole-3-carbox-p-chloroanilide, 2-hydroxy-8-chloro-11H-benzo(a)carbazole-3-carbox-p-fluoroanilide, 2-hydroxy-8-chloro-11H-benzo(a)carbazole-3-carbox-o-methylanilide, and the like. Coupler compounds can also be synthesized by the method disclosed in German Patent 2,410,723, the disclosure of which is totally incorporated herein by reference.

The bichromophoric photogenerating pigments employed in the imaging members of the present invention can be prepared by any suitable process. For example, to prepare a compound of Formula I, 1,4,5,8-naphthalenetetracarboxylic acid anhydride can be reacted with p-phenylenediamine to produce 1,4,5,8-naphthalenetetracarboxylic diimide as follows:

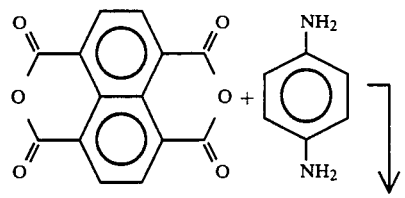

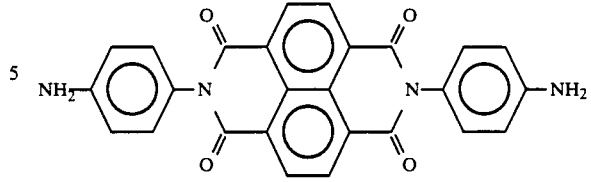

Subsequently, 1,4,5,8-naphthalenetetracarboxylic diimide can be reacted with aqueous hydrochloric acid, aqueous sodium nitrite, and tetrafluoboric acid to form a tetrazonium salt as follows:

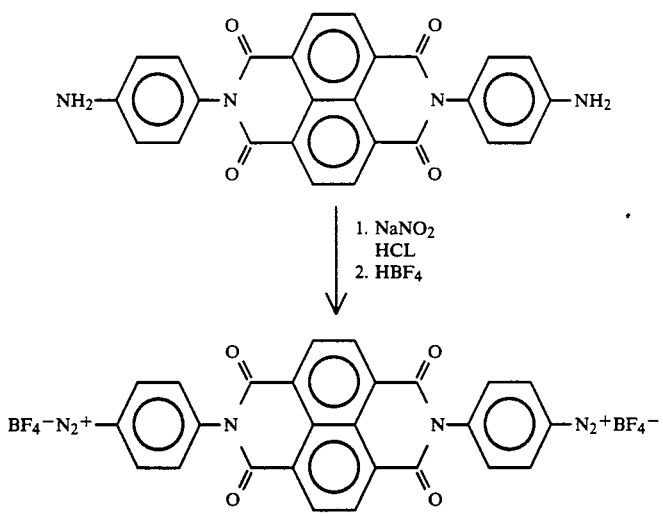

Thereafter, the tetrazonium salt can be reacted with the coupler compound of choice (2-hydroxy-3-naphthanilide is illustrated) in the presence of a base catalyst, such as sodium acetate, to form a bichromophoric compound of Formula I:

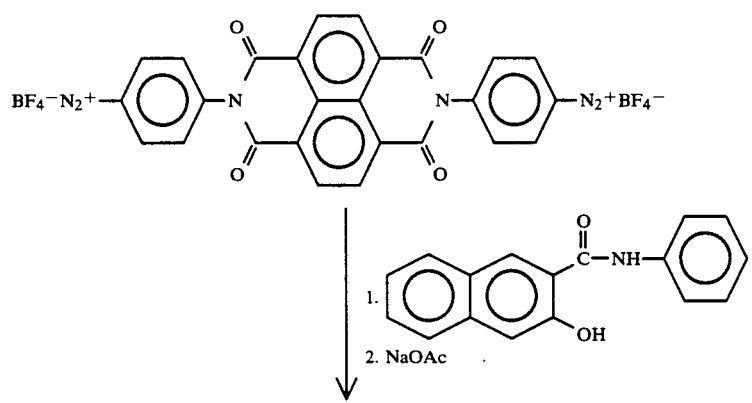

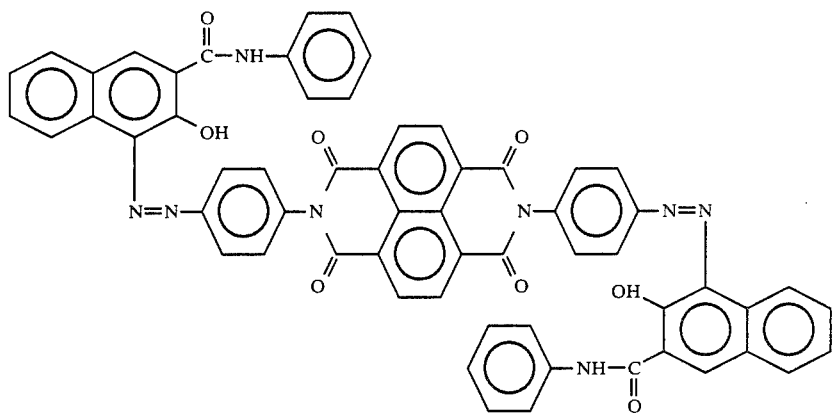

As illustrated, the process entailed beginning with paraphenylenediamine and resulted in formation of a compound with the azo groups in the para positions with respect to the perinone moiety. Beginning with ortho-phenylenediamine or meta-phenylenediamine will result in formation of compounds with the azo groups in the ortho and meta positions, respectively, with respect to the perinone moiety.

As an example of a process to prepare compounds of Formulas II and III, 1,4,5,8-naphthalenetetracarboxylic acid anhydride can be reacted with 1,2,4-triaminobenzene as follows:

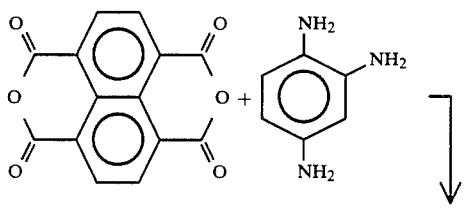

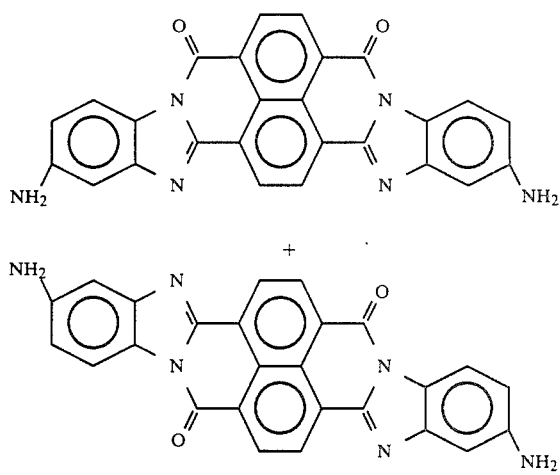

Subsequently, the compound thus formed can be reacted with aqueous hydrochloric acid, aqueous sodium nitrite, and tetrafluoboric acid to form a tetrazonium salt as follows:

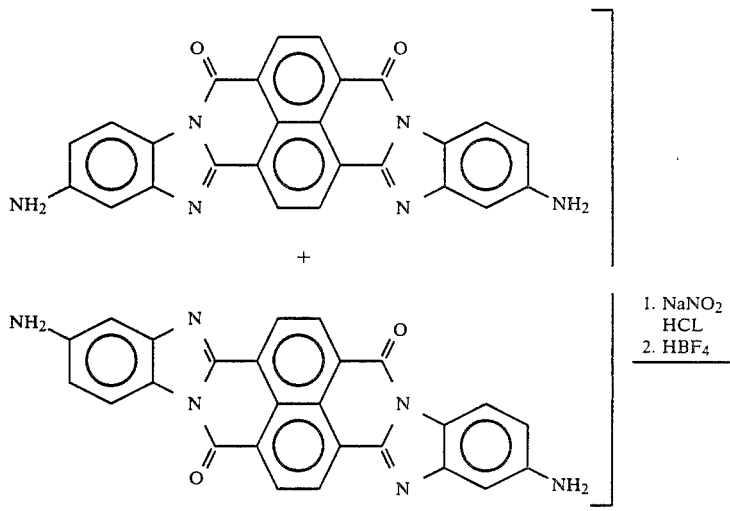

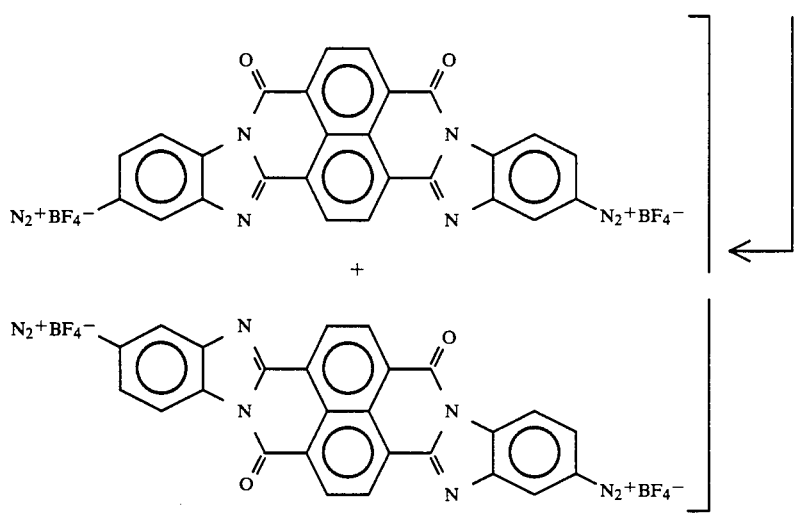
Thereafter, the tetrazonium salt can be reacted with the coupler compound of choice (2-hydroxy-3-naphthanilide is illustrated) in the presence of a base catalyst, such as sodium acetate, to form bichromophoric compounds of Formulae II and III:
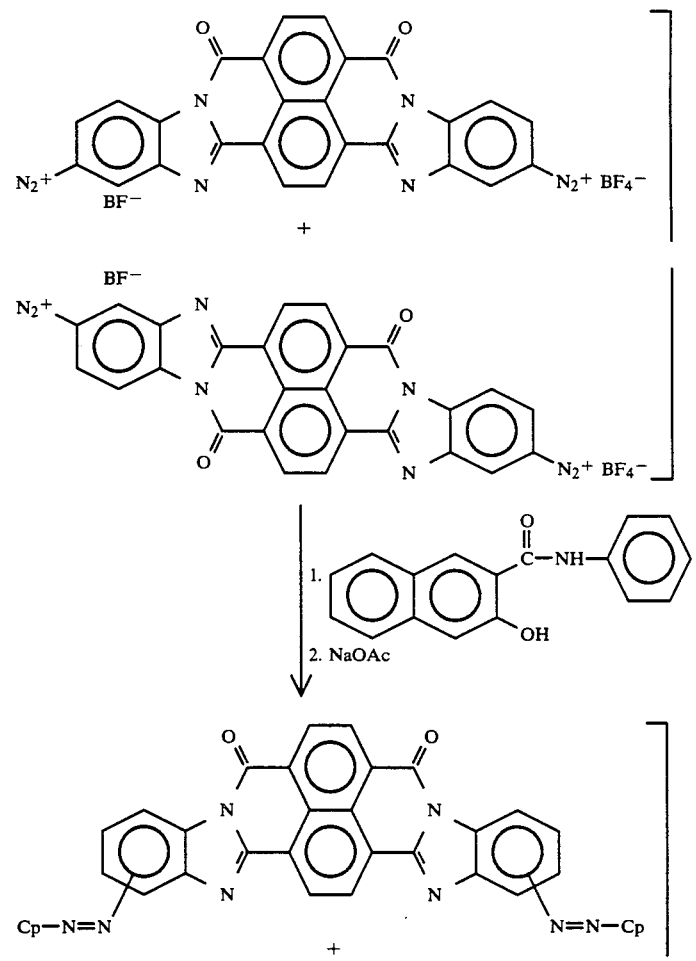

-continued

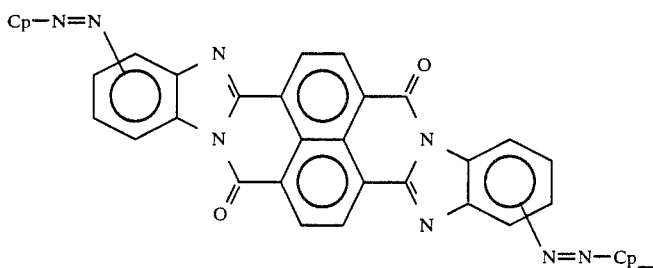

wherein Cp is

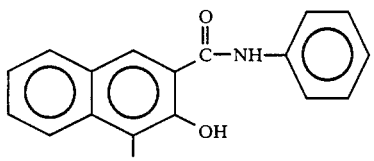

The present invention also encompasses a method of generating images with the photoconductive imaging members disclosed herein. The method comprises the steps of generating an electrostatic latent image on a photoconductive imaging member of the present invention, developing the latent image, and transferring the developed electrostatic image to a substrate. Optionally, the transferred image can be permanently affixed to the substrate. Development of the image may be achieved by a number of methods, such as cascade, touchdown, powder cloud, magnetic brush, and the like. Transfer of the developed image to a substrate may be by any method, including those making use of a corotron or a biased roll. The fixing step may be performed by means of any suitable method, such as flash fusing, heat fusing, pressure fusing, vapor fusing, and the like. Any material used in xerographic copiers and printers may be used as a substrate, such as paper, transparency material, or the like.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

A photogenerating compound of the formula racarboxylic anhydride obtained from Aldrich Chemical Company, 5.4 grams (0.05 mole) of p-phenylenediamine obtained from Aldrich Chemical Company, and 100 milliliters of 1-methyl-2-pyrrolidinone. The mixture was brought to reflux with stirring for 6 hours (oil bath temperature 240° C.). The resulting product mixture was cooled to about 90° C. and was filtered hot, and the solid product thus obtained was then purified by washing once with 150 milliliters of methanol, subsequently washing twice with 100 milliliters aliquots of a 5 percent $Na_2CO_3$ solution in water, thereafter washing once with 100 milliliters of water, and then washing once again with 100 milliliters of methanol. The purified product was dried under vacuum, resulting in 3.48 grams (78 percent yield) of a light pink solid identified as N,N'-bis(4-aminophenyl)-1,4,5,8-naphthalenetetracarboxylic diimide. The infrared spectrum of this product in KBr exhibited peaks at 3410, 3324, 3220 (N—H), 3060 (C—H), 1705, and 1662 (C=O) $cm^{-1}$ and the melting point of the product was over 300° C.

Subsequently, 1.12 grams (2.5 millimoles) of the N,N'-bis(4-aminophenyl)-1,4,5,8-naphthalenetetracarboxylic diimide thus prepared was stirred in an aqueous solution containing 10 milliliters of concentrated hydrochloric acid and 10 milliliters of water at about 60° C. for 1 hour and subsequently stirred overnight at room temperature. The resulting dispersion was cooled to 0° to 5° C. by an ice water bath, and a cold aqueous solu-

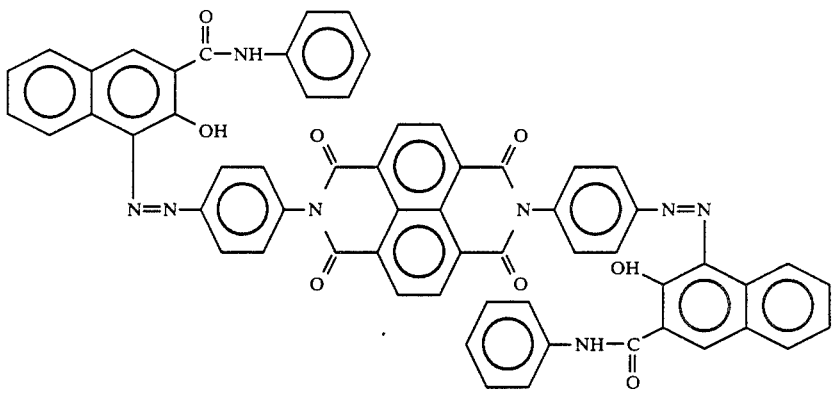

was prepared as follows. In a 250 milliliter flask were mixed 2.68 grams (0.01 mole) of 1,4,5,8-naphthalenetettion of sodium nitrite (0.8 gram in 2 milliliters of water) was added dropwise over 15 minutes. A white cloudy dispersion was obtained at the end of this process and about 700 milliliters of cold water was added to the dispersion. The product mixture was then filtered and 30 milliliters of $HBF_4$ was added to the filtrate, resulting in formation of a white precipitate identified as the tetrazonium salt of N,N'-bis(4-aminophenyl)-1,4,5,8-naphthalenetetracarboxylic diimide. The white solid was isolated by filtration and was purified by washing with a small amount of cold methanol and ether to yield 0.79 gram (49 percent yield) of product. The infrared spectrum of this product in KBr exhibited peaks at 2246 ($—N^+\equiv N$), 1710, and 1670 ($C=O$) cm$^{-1}$.

Thereafter, 0.79 grams of the tetrazonium salt thus prepared was dissolved in about 150 milliliters of cold dimethyl formamide in a 3-neck 1 liter flask surrounded by an ice water bath. A cold dimethyl formamide solution containing 0.69 gram of 2-hydroxy-3-naphthanilide obtained from Aldrich Chemical Company in 70 milliliters of dimethyl formamide was added into the salt solution, upon which the color of the salt solution changed from yellow to red. Subsequently, a cold aqueous solution of sodium acetate (1.27 grams NaOAc in 19 milliliters of water) was added to the solution. After the addition was completed, the ice bath was removed and the mixture was stirred at room temperature overnight. Thereafter, the solid photogenerating pigment product was isolated by filtration and purified by washing twice with 150 milliliter aliquots of water at 80° C., followed by washing three times with 150 milliliter aliquots of dimethyl formamide at 80° C., subsequently washing with 150 milliliters of acetone, and then washing with 150 milliliters of diethyl ether, resulting in 0.98 gram (39 percent overall yield) of red powder. The infrared spectrum of this product in KBr exhibited peaks at 1718 and 1680 ($C=O$) cm$^{-1}$ and exhibited a melting point of over 300° C. In addition, an elemental analysis was performed which further identified the product as the photogenerating pigment of the above formula:

| | | |
|---|---|---|
| calculated for $C_{60}H_{36}N_8O_8$: | C 72.28 | H 3.64 |
| actual composition: | C 72.62 | H 3.09 |

EXAMPLE II

An imaging member was prepared with the photogenerating pigment prepared in Example I as follows. To a 1 ounce amber bottle there were added 52.8 milligrams of polyvinyl formal (obtained from Scientific Polymer Products, Inc., formal content 82 percent, acetate content 12 percent, hycroxy content 6 percent) and 10 milliliters of tetrahydrofuran. The bottle was placed on a Wrist Action Shaker and the polymer was dissolved in the tetrahydrofuran. Subsequently, 211.2 milligrams of the photogenerating material prepared in Example I and about 85 grams of steel shots (⅛ inch diameter stainless steel shot) were added to the bottle and the bottle was placed on a Red Devil Paint Conditioner (Model 5100X) and shaken for about 30 minutes. The resulting dispersion was coated onto a 7.5 inch by 10 inch fire-cleaned brush-grained aluminum substrate obtained from Ron Ink Company using a Gardner Mechanical Drive with a 6 inch wide Bird film applicator (0.5 mil wet gap) inside a humidity-controlled glove-box. The relative humidity was controlled to less than 25 percent. The resulting charge generator layer was air-dried for about 30 minutes and then vacuum dried for about 1 hour at 100° C. The thickness of the charge generator layer was estimated to be about 0.4 micron from TEM micrographs.

The above charge generator layer was overcoated with a charge transport layer prepared as follows. A solution containing 4.2 grams of Makrolon ®, a polycarbonate resin obtained from Larbensabricken Bayer A.G., 2.8 grams of N,N'-bis(3''-methylphenyl)-1,1'-biphenyl-4,4'-diamine prepared as disclosed in U.S. Pat. No. 4,265,990, the disclosure of which is totally incorporated herein by reference, was prepared by dissolving the above materials in 31 milliliters of methylene chloride inside a 2 ounce amber bottle. The transport layer was obtained by coating the solution onto the charge generator layer using a 3.5 inch wide, 5 mil wet gap Bird Film Applicator, resulting in a transport layer about 25 microns thick. The resulting photoconductive device was air dried for about 1 hour and vacuum dried at 100° C. for about 16 hours before electrical testing.

The imaging member thus prepared was evaluated as follows. Xerographic measurements were made on a flat plate scanner using 2 inch by 2.5 inch samples of the imaging member prepared as described herein. The surface potential of the device was monitored with a capacitively coupled ring probe connected to a Keithley electrometer (Model 610C) in the Coulomb mode. The output of the electrometer was displayed on a strip-chart recorder (HP Model 740A) which was calibrated by applying known voltage on an uncoated aluminum substrate. The exposure wavelength and the intensity were selected and adjusted using interference and neutral density filters, respectively. With the shutter closed, the dark decay was measured. With the shutter open, the photosensitivity at a known light exposure was recorded. The imaging member was charged to about −1000 volts at the peak voltage and was allowed to discharge in the dark for 2 to 3 seconds to determine the dark decay. Subsequently, the imaging member was exposed to an erase lamp to photodischarge the surface charge and to determine its residual voltage ($V_R$). Thereafter, the imaging member was charged in a similar manner and exposed to visible radiation at the dark development potential, and the sensitivity of the member was determined in terms of $E_{\frac{1}{2}}$, which represents the energy required to discharge half of the dark development potential. The imaging member exhibited a dark development potential ($V_{ddp}$) of −880 volts, a dark decay of −36 volts per second, and a residual potential ($V_R$) of −25 volts. The imaging member exhibited photosensitivity in the 400 to 600 nanometer range, with the sensitivity ($E_{\frac{1}{2}}$) being measured under varying wavelengths of light as follows:

| Wavelength (nm) | $E_{\frac{1}{2}}$ ergs/cm$^2$) |
|---|---|
| 400 | 64.8 |
| 450 | 13.8 |
| 520 | 15.6 |
| 600 | 46.9 |

As the data indicate, the imaging member exhibits photosensitivity in the measured wavelength range.

EXAMPLE III

Photogenerating compounds of the formulae

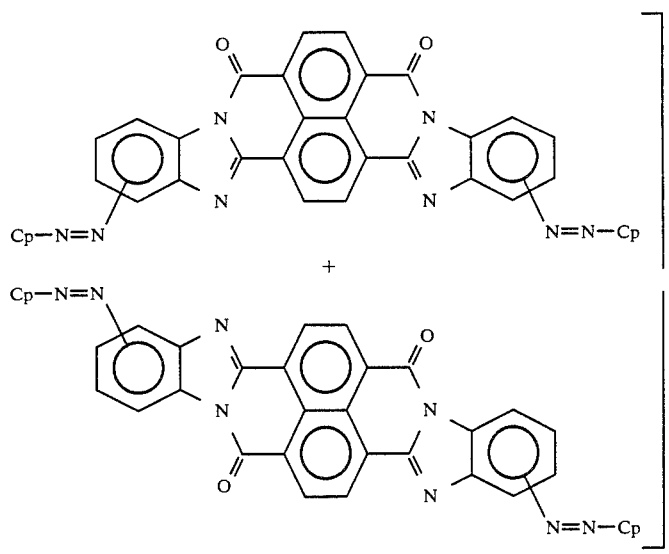

wherein Cp is

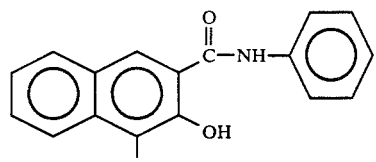

are prepared as follows. In a 250 milliliter flask are mixed 2.68 grams (0.01 moles) of 1,4,5,8-naphthalenetetracarboxylic anhydride obtained from Aldrich Chemical Company, 6.15 grams (0.05 moles) of 1,2,4-triaminobenzene obtained from Eastman Kodak Company, and 100 milliliters of 1-methyl-2-pyrrolidinone. The mixture is brought to reflux with stirring for 8 hours (oil bath temperature 240° C.). The resulting product mixture is cooled to about 90° C. and is filtered hot, and the solid product thus obtained is then purified by washing once with 150 milliliters of methanol, subsequently washing twice with 100 milliliter aliquots of a 5 percent $Na_2CO_3$ solution in water, thereafter washing once with 100 milliliters of water, and then washing once again with 100 milliliters of methanol. The purified product is dried under vacuum, resulting in formation of a solid, bis-(4-aminobenzimidazole) perinone.

Subsequently, 1.20 grams (2.5 millimoles) of the bis-(4-aminobenzimidazole) perinone is stirred in an aqueous solution containing 10 milliliters of concentrated hydrochloric acid and 10 milliliters of water at about 60° C. for 1 hour and subsequently stirred overnight at room temperature. The resulting dispersion is cooled to 0° to 5° C. by an ice water bath, and a cold aqueous solution of sodium nitrite (0.8 gram in 2 milliliters of water) is added dropwise over 15 minutes. A dispersion is obtained at the end of this process and about 700 milliliters of cold water are added to the dispersion. The product mixture is then filtered and 30 milliliters of $HBF_4$ are added to the filtrate, resulting in formation of a precipitate which is the tetrazonium salt of bis-(4-aminobenzimidazole) perinone. The product is isolated by filtration and purified by washing with a small amount of cold methanol and ether to yield the tetrazonium salt product.

Thereafter, 0.84 gram of the tetrazonium salt thus prepared is dissolved in about 150 milliliters of cold dimethyl formamide in a 3-neck 1 liter flask surrounded by an ice water bath. A cold dimethyl formamide solution containing 0.69 gram of 2-hydroxy-3-naphthanilide obtained from Aldrich Chemical Company in 70 milliliters of dimethyl formamide is added into the salt solution. Subsequently, a cold aqueous solution of sodium acetate (1.27 grams of NaOAc in 19 milliliters of water) is added to the solution. After the addition is completed, the ice bath is removed and the mixture is stirred at room temperature overnight. Thereafter, the solid photogenerating pigment product is isolated by filtration and purified by washing twice with 150 milliliter aliquots of water at 80° C., followed by washing three times with 150 milliliter aliquots of dimethyl formamide at 80° C., subsequently washing with 150 milliliters of acetone, and then washing with 150 milliliters of diethyl ether, resulting in a mixture of the photogenerating compounds of the formulae indicated above (cis and trans isomers).

EXAMPLE IV

An imaging member is prepared with the photogenerating pigment prepared as described in Example III as follows. To a 1 ounce amber bottle there are added 52.8 milligrams of polyvinyl formal (obtained from Scientific Polymer Products, Inc., formal content 82 percent, acetate content 12 percent, hydroxy content 6 percent) and 10 milliliters of tetrahydrofuran. The bottle is placed on a Wrist Action Shaker and the polymer is dissolved in the tetrahydrofuran. Subsequently, 211.2 milligrams of the photogenerating material prepared in Example III and about 85 grams of steel shots ($\frac{1}{8}$ inch diameter stainless steel shot) are added to the bottle and the bottle is placed on a Red Devil Paint Conditioner (Model 5100X) and shaken for about 30 minutes. The resulting dispersion is coated onto a 7.5 inch by 10 inch fire-cleaned brush-grained aluminum substrate obtained from Ron Ink Company using a Gardner Mechanical Drive with a 6 inch wide Bird Film Applicator (0.5 mil wet gap) inside a humidity-controlled glove-box. The relative humidity is controlled to less than 25 percent. The resulting charge generator layer is air dried for about 30 minutes and then vacuum dried for about 1 hour at 100° C. to result in a charge generator layer with a thickness of about 0.4 micron.

The above charge generator layer is overcoated with a charge transport layer prepared as follows. A solution containing 4.2 grams of Makrolon ®, a polycarbonate resin obtained from Larbensabricken Bayer A.G., 2.8 grams of N,N'-bis (3"-methylphenyl)-1,1'-biphenyl-4,4'-diamine prepared as disclosed in U.S. Pat. No. 4,265,990, the disclosure of which is totally incorporated herein by reference, is prepared by dissolving the above materials in 31 milliliters of methylene chloride inside a 2 ounce amber bottle. The transport layer is obtained by coating the solution onto the charge generator layer using a 3.5 inch wide, 5 mil wet gap Bird Film Applicator, resulting in a transport layer about 25 microns thick. The resulting photoconductive device is air dried for about 1 hour and vacuum dried at 100° C. for about 16 hours before electrical testing.

The imaging member thus prepared is evaluated as described in Example II. It is believed that the resulting image member will exhibit photosensitivity in the range of 400 to 600 nanometers with substantially similar properties to those of the member in Example II.

Other embodiments and modifications of the present invention may occur to those skilled in the art subsequent to a review of the information presented herein; these embodiments and modifications, as well as equivalents thereof, are also included within the scope of this invention.

What is claimed is:

1. An imaging member which comprises a conductive substrate and a photogenerator layer containing a photogenerating compound selected from the group consisting of:

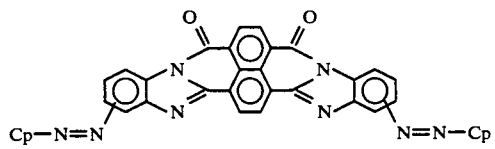

II

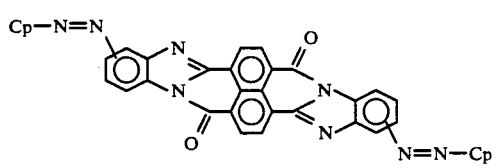

III

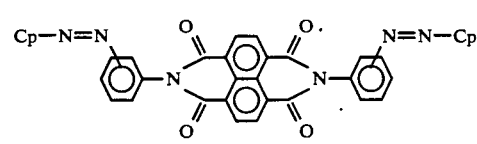

I

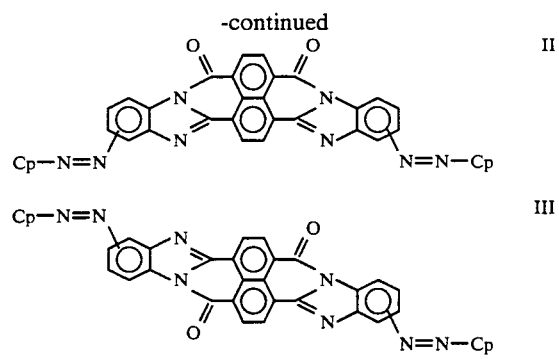

and mixtures thereof, wherein Cp represents a coupler group.

2. An imaging member according to claim 1 also containing a charge transport layer.

3. An imaging member according to claim 2 wherein the photogenerator layer is situated between the conductive substrate and the charge transport layer.

4. An imaging member according to claim 2 wherein the charge transport layer is situated between the conductive substrate and the photogenerator layer.

5. An imaging member according to claim 2 wherein the charge transport layer comprises an aryl amine compound.

6. An imaging member according to claim 5 wherein the aryl amine is of the formula:

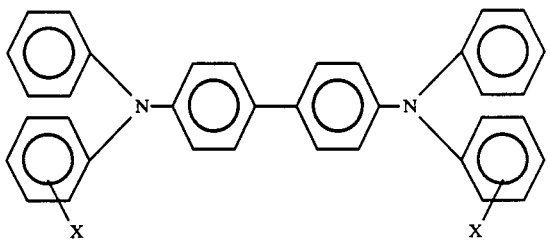

wherein X is selected from the group consisting of alkyl and halogen and wherein the aryl amine is dispersed in a highly insulating and transparent organic resinous binder.

7. An imaging member according to claim 6 wherein X is selected from the group consisting of ortho ($CH_3$), meta ($CH_3$), para ($CH_3$), ortho (Cl), meta (Cl), and para (Cl).

8. An imaging member according to claim 6 wherein the resinous binder is selected from the group consisting of polycarbonates and polystyrenes.

9. An imaging member according to claim 1 wherein the conductive substrate is a metal.

10. An imaging member according to claim 1 wherein the conductive substrate is aluminum.

11. An imaging member according to claim 1 wherein the photogenerator layer has a thickness of from about 0.05 to about 10 microns.

12. An imaging member according to claim 1 wherein the photogenerating compound is dispersed in a resinous binder in an amount of from about 5 percent by weight to about 95 percent by weight.

13. An imaging member according to claim 12 wherein the resinous binder is selected from the group consisting of polyesters, polyvinyl butyrals, polycarbonates, and polyvinyl formals.

14. An imaging member according to claim 1, wherein the coupler group is selected from the group consisting of

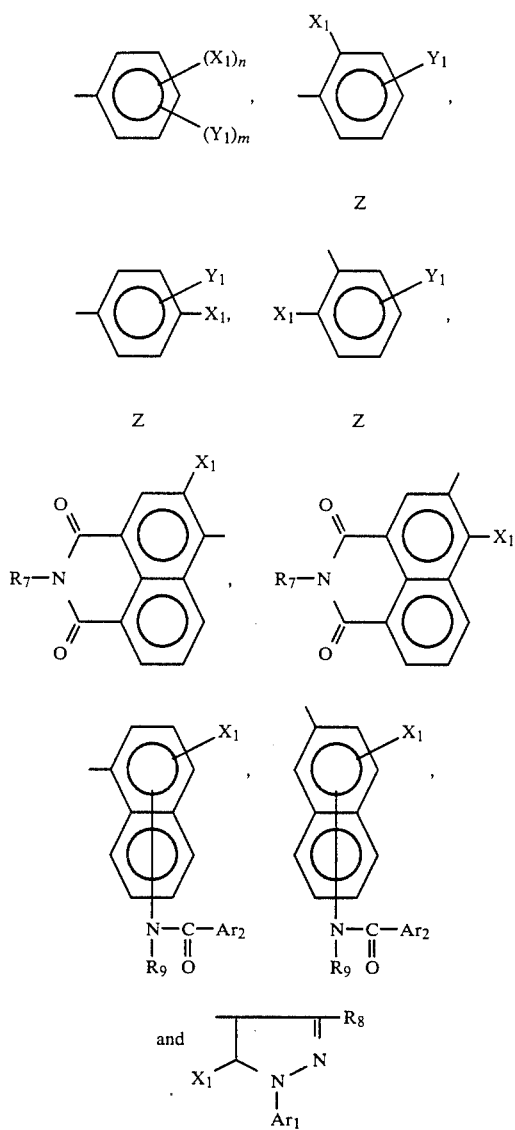

wherein $X_1$ is selected from the group consisting of —OH, —NR$_1$R$_2$, and —NHSO$_2$—R$_3$ (wherein R$_1$ and R$_2$ are selected from the group consisting of hydrogen, substituted alkyl groups, and non-substituted alkyl groups, and R$_3$ is selected from the group consisting of substituted alkyl groups, non-substituted alkyl groups, substituted aryl groups, and non-substituted aryl groups), Y$_1$ is selected from the group consisting of hydrogen, halogens, substituted alkyl groups, non-substituted alkyl groups, substituted alkoxy groups, non-substituted alkoxy groups, carboxyl groups, sulfo groups, substituted sulfamoyl groups, non-substituted sulfamoyl groups, and

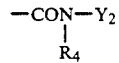

wherein R$_4$ selected from the group consisting of hydrogen, alkyl groups, substituted alkyl groups, phenyl groups, and a substituted phenyl groups, and Y$_2$ is selected from the group consisting of cyclic hydrocarbons, substituted cyclic hydrocarbons, heterocycles, and substituted heterocycles, and $$-N=C-R_5$$
$$\phantom{-N=C-}R_6$$

wherein R$_5$ is selected from the group consisting of cyclic hydrocarbons, substituted cyclic hydrocarbons, heterocycles, and substituted heterocycles and R$_6$ is selected from the group consisting of hydrogen, alkyl groups, substituted alkyl groups, phenyl groups, and substituted phenyl groups, and wherein R$_5$ and R$_6$ may form a ring, Z is selected from the group consisting of cyclic hydrocarbons, substituted cyclic hydrocarbons, heterocycles, and substituted heterocycles, n is an integer of 1 or 2, m is an integer of 1 or 2, R$_7$ is selected from the group consisting of substituted hydrocarbonyl groups and non-substituted hydrocarbonyl groups, R$_8$ is selected from the group consisting of alkyl groups, carbamoyl groups, carboxyl groups, and carboxyl esters, Ar$_1$ is selected from the group consisting of cyclic hydrocarbons and substituted cyclic hydrocarbons, R$_9$ is selected from the group consisting of hydrogen, substituted hydrocarbonyl groups, and non-substituted hydrocarbonyl groups, and Ar$_2$ is selected from the group consisting of cyclic hydrocarbons and substituted cyclic hydrocarbons.

15. An imaging member according to claim 1, wherein the coupler group is selected from the group consisting of

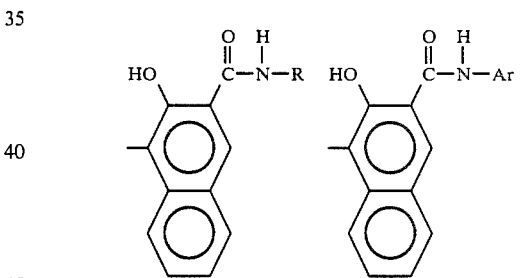

wherein R is selected from the group consisting of substituted and non-substituted aliphatic hydrocarbon with from 1 to about 20 carbon atoms and Ar is selected from the group consisting of substituted and non-substituted aromatic hydrocarbon group with from 6 to about 24 carbon atoms and substituted and non-substituted heterocyclic moieties;

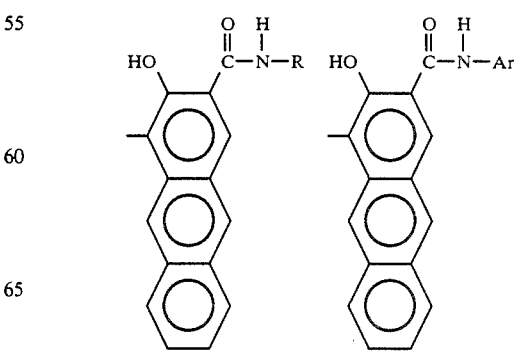

wherein R is selected from the group consisting of substituted and non-substituted aliphatic hydrocarbon with from 1 to about 20 carbon atoms and Ar is selected from the group consisting of substituted and non-substituted aromatic hydrocarbon group with from 6 to about 24 carbon atoms and substituted and non-substituted heterocyclic moieties;

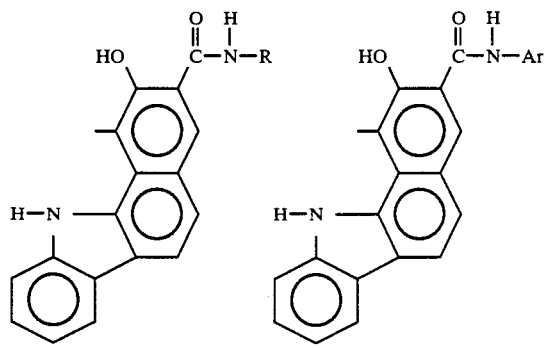

wherein R is selected from the group consisting of substituted and non-substituted aliphatic hydrocarbon with from 1 to about 20 carbon atoms and Ar is selected from the group consisting of substituted and non-substituted aromatic hydrocarbon group with from 6 to about 24 carbon atoms and substituted and non-substituted heterocyclic moieties;

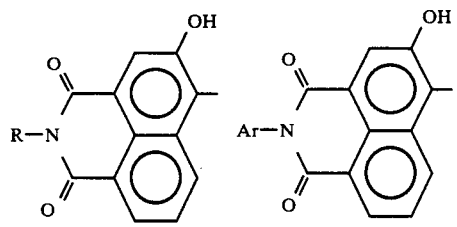

wherein R is selected from the group consisting of substituted and non-substituted aliphatic hydrocarbon with from 1 to about 20 carbon atoms and Ar is selected from the group consisting of substituted and non-substituted aromatic hydrocarbon group with from 6 to about 24 carbon atoms and substituted and non-substituted heterocyclic moieties;

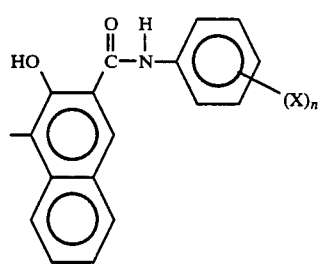

wherein X is selected from the group consisting of H, $CH_3$, $C_2H_5$, $C_3H_7$, Cl, F, Br, I, $NO_2$, $CF_3$, $OCH_3$, $OC_2H_5$, CN, $NH_2$, and OH and n is 0, 1, 2, or 3;

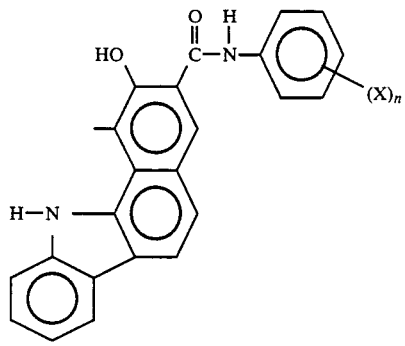

wherein X is selected from the group consisting of H, $CH_3$, $C_2H_5$, $C_3H_7$, Cl, F, Br, I, $NO_2$, $CF_3$, $OCH_3$, $OC_2H_5$, CN, $NH_2$, and OH and n is 0, 1, 2, or 3;

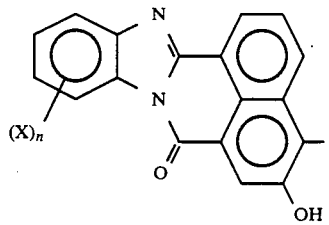

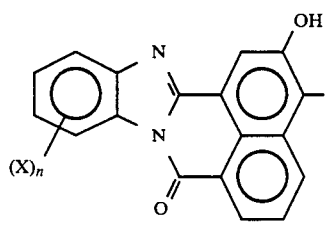

wherein X is selected from the group consisting of H, $CH_3$, $C_2H_5$, $C_3H_7$, Cl, F, Br, I, $NO_2$, $CF_3$, $OCH_3$, $OC_2H_5$, CN, $NH_2$, and OH and n is 0, 1, 2, or 3; and

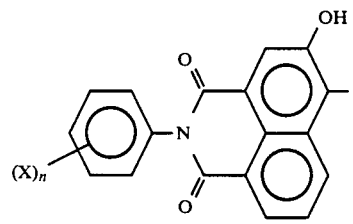

wherein X is selected from the group consisting of H, $CH_3$, $C_2H_5$, $C_3H_7$, Cl, F, Br, I, $NO_2$, $CF_3$, $OCH_3$, $OC_2H_5$, CN, $NH_2$, and OH and n is 0, 1, 2, or 3.

16. A method of imaging which comprises generating an electrostatic latent image on an imaging member of claim 1, developing the latent image, and transferring the developed electrostatic image to a suitable substrate.

17. A photogenerating compound of the formula

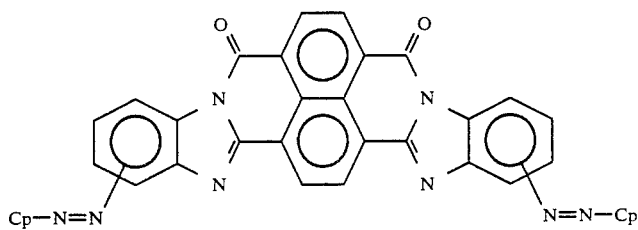

wherein Cp represents a coupler group.

18. A photogenerating compound of the formula

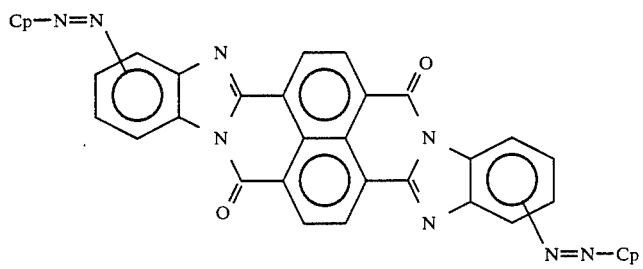 III wherein Cp represents a coupler group.

19. A photogenerating compound according to claim 17, or 18 wherein the coupler group is selected from the group consisting of

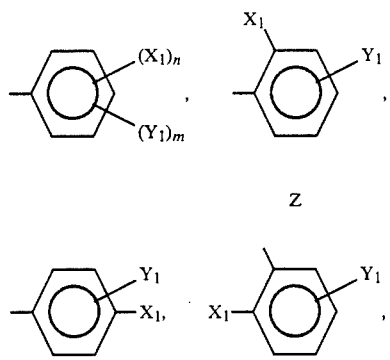,

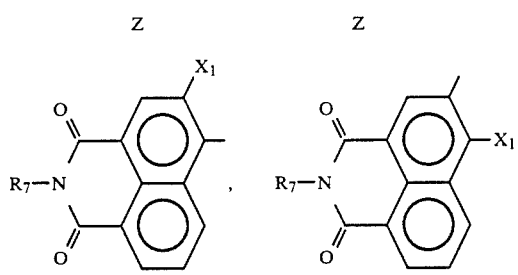,

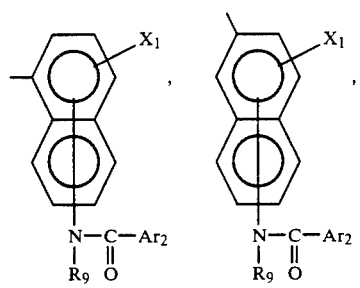,

-continued

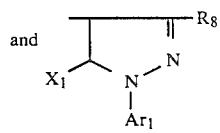

and

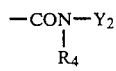

wherein $X_1$ is selected from the group consisting of —OH, —NR$_1$R$_2$, and —NHSO$_2$—R$_3$ (wherein R$_1$ and R$_2$ are selected from the group consisting of hydrogen, substituted alkyl groups, and non-substituted alkyl groups, and R$_3$ is selected from the group consisting of substituted alkyl groups, non-substituted alkyl groups, substituted aryl groups, and non-substituted aryl groups), Y$_1$ is selected from the group consisting of hydrogen, halogens, substituted alkyl groups, non-substituted alkyl groups, substituted alkoxy groups, non-substituted alkoxy groups, carboxyl groups, sulfo groups, substituted sulfamoyl groups, non-substituted sulfamoyl groups, and

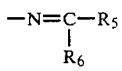

wherein R$_4$ selected from the group consisting of hydrogen, alkyl groups, substituted alkyl groups, phenyl groups, and a substituted phenyl groups, and Y$_2$ is selected from the group consisting of cyclic hydrocarbons, substituted cyclic hydrocarbons, heterocycles, and substituted heterocycles, and $$-N=C-R_5$$
$$\phantom{-N=C-}R_6$$

wherein R$_5$ is selected from the group consisting of cyclic hydrocarbons, substituted cyclic hydrocarbons, heterocycles, and substituted heterocycles and R$_6$ is selected from the group consisting of hydrogen, alkyl groups, substituted alkyl groups, phenyl groups, and substituted phenyl groups, and wherein R$_5$ and R$_6$ may form a ring, Z is selected from the group consisting of cyclic hydrocarbons, substituted cyclic hydrocarbons, heterocycles, and substituted heterocycles, n is an integer of 1 or 2, m is an integer of 1 or 2, $R_7$ is selected from the group consisting of substituted hydrocarbonyl groups and non-substituted hydrocarbonyl groups, $R_8$ is selected from the group consisting of alkyl groups, carbamoyl groups, carboxyl groups, and carboxyl esters, $Ar_1$ is selected from the group consisting of cyclic hydrocarbons and substituted cyclic hydrocarbons, $R_9$ is selected from the group consisting of hydrogen, substituted hydrocarbonyl groups, and non-substituted hydrocarbonyl groups, and $Ar_2$ is selected from the group consisting of cyclic hydrocarbons and substituted cyclic hydrocarbons.

20. A photogenerating compound according to claim 17, or 18 wherein the coupler group is selected from the group consisting of

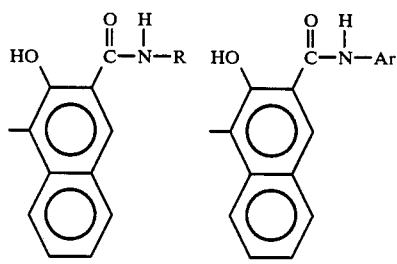

wherein R is selected from the group consisting of substituted and non-substituted aliphatic hydrocarbon with from 1 to about 20 carbon atoms and Ar is selected from the group consisting of substituted and non-substituted aromatic hydrocarbon group with from 6 to about 24 carbon atoms and substituted and non-substituted heterocyclic moieties;

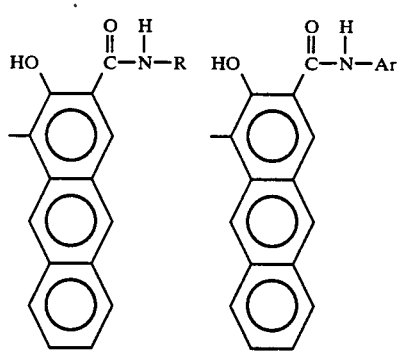

wherein R is selected from the group consisting of substituted and non-substituted aliphatic hydrocarbon with from 1 to about 20 carbon atoms and Ar is selected from the group consisting of substituted and non-substituted aromatic hydrocarbon group with from 6 to about 24 carbon atoms and substituted and non-substituted heterocyclic moieties;

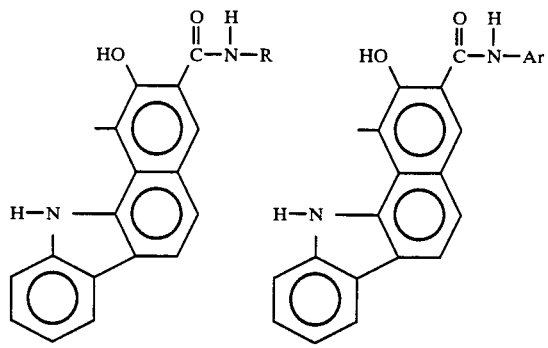

wherein R is selected from the group consisting of substituted and non-substituted aliphatic hydrocarbon with from 1 to about 20 carbon atoms and Ar is selected from the group consisting of substituted and non-substituted aromatic hydrocarbon group with from 6 to about 24 carbon atoms and substituted and non-substituted heterocyclic moieties;

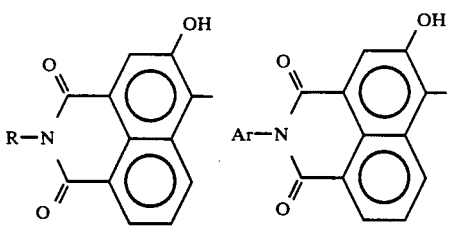

wherein R is selected from the group consisting of substituted and non-substituted aliphatic hydrocarbon with from 1 to about 20 carbon atoms and Ar is selected from the group consisting of substituted and non-substituted aromatic hydrocarbon group with from 6 to about 24 carbon atoms and substituted and non-substituted heterocyclic moieties;

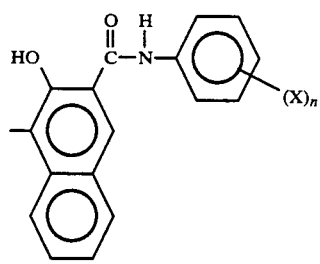

wherein X is selected from the group consisting of H, $CH_3$, $C_2H_5$, $C_3H_7$, Cl, F, Br, I, $NO_2$, $CF_3$, $OCH_3$, $OC_2H_5$, CN, $NH_2$, and OH and n is 0, 1, 2, or 3;

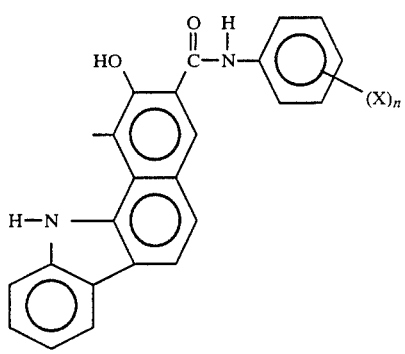
wherein X is selected from the group consisting of H, CH₃, C₂H₅, C₃H₇, Cl, F, Br, I, NO₂, CF₃, OCH₃, OC₂H₅, CN, NH₂, and OH and n is 0, 1, 2, or 3;
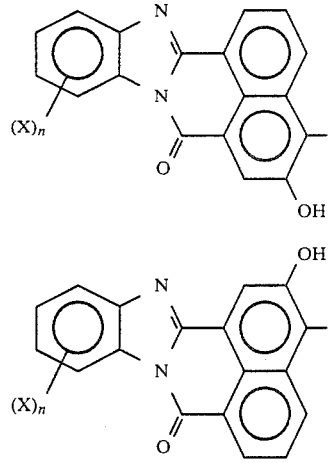
wherein X is selected from the group consisting of H, CH₃, C₂H₅, C₃H₇, Cl, F, Br, I, NO₂, CF₃, OCH₃, OC₂H₅, CN, NH₂, and OH and n is 0, 1, 2, or 3; and
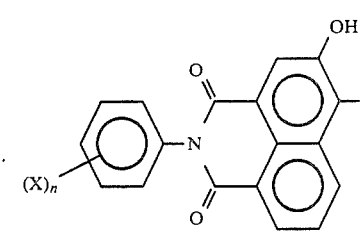
wherein X is selected from the group consisting of H, CH₃, C₂H₅, C₃H₇, Cl, F, Br, I, NO₂, CF₃, OCH₃, OC₂H₅, CN, NH₂, and OH and n is 0, 1, 2, or 3.
* * * * *